(12) United States Patent
Horii et al.

(10) Patent No.: US 7,024,109 B2
(45) Date of Patent: Apr. 4, 2006

(54) INFORMATION PROCESSING APPARATUS

(75) Inventors: Hiroyuki Horii, Kanagawa (JP); Hirofumi Hirano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 963 days.

(21) Appl. No.: 09/948,631

(22) Filed: Sep. 10, 2001

(65) Prior Publication Data

US 2002/0037168 A1  Mar. 28, 2002

(30) Foreign Application Priority Data

| Sep. 12, 2000 | (JP) | ............................. 2000-277084 |
| Sep. 19, 2000 | (JP) | ............................. 2000-284097 |
| Sep. 19, 2000 | (JP) | ............................. 2000-284098 |

(51) Int. Cl.
*G03B 17/48* (2006.01)

(52) U.S. Cl. .................. 396/429; 396/50; 396/312; 380/54; 375/225; 354/401; 715/764; 358/1.15; 358/1.4

(58) Field of Classification Search ............ 348/231.4, 348/211.12, 211.2; 396/429, 50, 312; 380/54; 358/1.15, 1.4; 382/100, 321; 375/225; 715/764

See application file for complete search history.

(56) References Cited

U.S. PATENT DOCUMENTS

| 4,183,645 | A | * | 1/1980 | Ohmura et al. ............... 396/50 |
| 5,276,472 | A | * | 1/1994 | Bell et al. .................... 396/312 |
| 5,943,097 | A | | 8/1999 | Horii .......................... 348/411 |
| RE36,338 | E | * | 10/1999 | Fukuoka .................. 348/231.4 |
| 6,018,363 | A | | 1/2000 | Horii .......................... 348/219 |
| 6,078,758 | A | * | 6/2000 | Patton et al. ............... 396/312 |
| 6,285,831 | B1 | * | 9/2001 | Hara ........................... 396/50 |
| 6,388,681 | B1 | * | 5/2002 | Nozaki ....................... 715/764 |
| 6,421,470 | B1 | * | 7/2002 | Nozaki et al. .............. 382/321 |
| 6,539,180 | B1 | * | 3/2003 | King .......................... 396/429 |
| 6,628,326 | B1 | * | 9/2003 | Manico et al. ......... 348/211.12 |
| 6,687,383 | B1 | * | 2/2004 | Kanevsky et al. .......... 382/100 |
| 6,760,369 | B1 | * | 7/2004 | Chida ......................... 375/225 |
| 6,775,381 | B1 | * | 8/2004 | Nelson et al. ................ 380/54 |

* cited by examiner

*Primary Examiner*—Mark Wallerson
*Assistant Examiner*—Satwant Singh
(74) *Attorney, Agent, or Firm*—Fitzpatrick, Cella, Harper & Scinto

(57) ABSTRACT

Sound information related to an image is inputted together with the image taken by a camera, and is printing outputted as a two-dimensional bar code data with the image by a printer provided in the camera as one body. Specifically, a printed matter is formed by printing the taken image and the sound information sound inputted in relation to the image. Thereby, the printed matter is printed with a comment on image taking environment such as information on a subject of image taking and a light condition when taking the image or on the subject of the image taking inputted through the sound. As a result, it can be used as a storage medium which stores information of higher dimension and is easy to access.

13 Claims, 20 Drawing Sheets

NORMAL POSITION

LONGITUDINAL POSITION 1

LONGITUDINAL POSITION 2

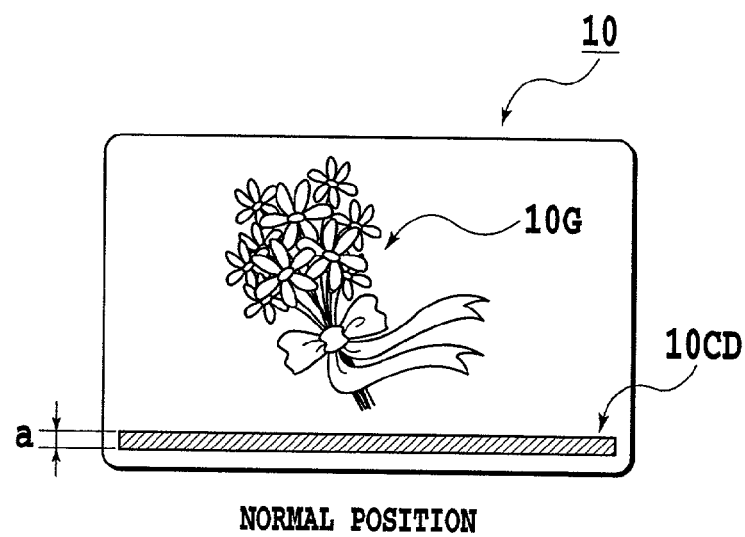
FIG.17A  NORMAL POSITION
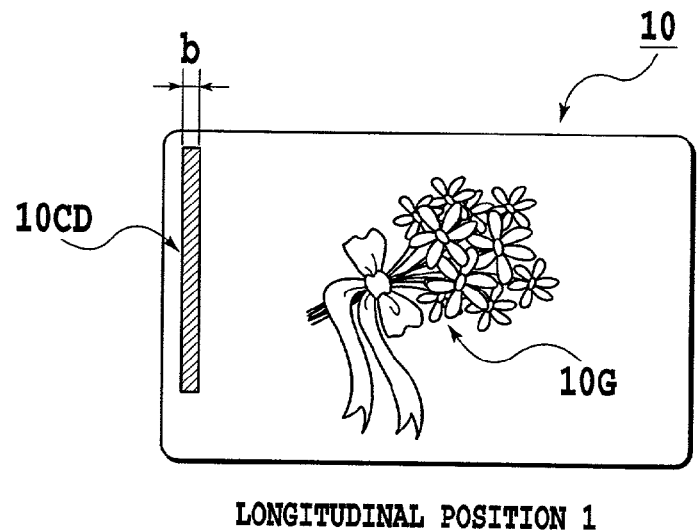
FIG.17B  LONGITUDINAL POSITION 1
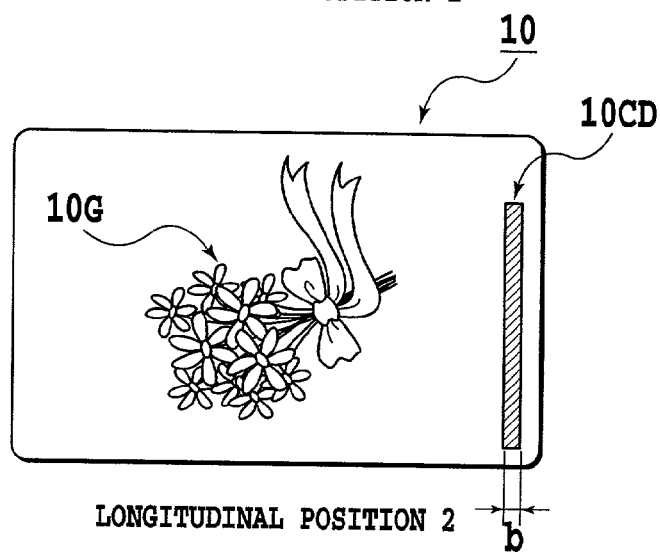
FIG.17C  LONGITUDINAL POSITION 2

INFORMATION PROCESSING APPARATUS

This application is based on Japanese Patent Application Nos. 2000-277084 filed Sep. 12, 2000, 2000-284097 and 2000-284098 both filed Sep. 19, 2000, the content of which is incorporated hereinto by reference.

BACKGROUND OF THE INVENTION

1. Field of the Invention

The present invention relates to an information processing apparatus, specifically to an information processing apparatus in which sound information inputted using the apparatus or the like is formed as a code data capable of being decoded, along with an image obtained through an image taking function that the apparatus or the like has, on a medium by an image formation function that the apparatus or the like has similarly.

2. Description of the Related Art

Recently, with the popularization of digital cameras, scanners, and personal computers which can process data obtained by these cameras and scanners, there is an increase in cases of afterward applying image data obtained through image taking by means of the digital cameras or the like.

For example, there are cases such that part of image data obtained by means of the digital camera is taken out and synthesized with other image data, or some image data are provided for being edited so as to make a significant information. Further, it is well known that an image data obtained by the scanner is similarly provided for forming other information.

Application of such image data is well known to be executed with use of an image in the form of electronic data once taken in a predetermined storage medium, but on the other hand, the above image data obtained through the image taking is also used in the form of a printed photograph or printed image. Such print output information has an advantage particularly in that a structure for access or storage thereof is simple. That is, the information can be seen or stored without using a specific device.

Therefore, for the print output information, superiority of such information will be even further improved if the information is made to have high grade or multidimensionalized.

For example, if information, or a comment on a subject of the image taking, or information on light condition, or the like, for example, at the time when the image taking using a digital camera is performed, is printed on the printing medium along with the printed image, and is reproduced, the situation at the time of the image taking or information on the photographed subject, in addition to information of the taken image per se, can be known so that further detailed information as storage information can be obtained. Further, when applying the above image data in the form of electronic data, editing or the like can be performed on a basis of the further detailed storage information so that the image data can become highly applicable information.

On the other hand, as means for inputting such information as described above simultaneously with image taking, sound input is known. Further, it has been conventionally known that the inputted sound information is printed as, for example, dot pattern data. However, it is not known that sound information is print outputted as information related to a printed image as part thereof together with the printed image. In particular, no apparatus has been known which is capable of inputting a sound simultaneously with image taking or after image taking and the sound is printed together with the taken image.

Further, when a sound information pattern is printed together with an image, depending on the printed position of the pattern, the pattern itself may sometimes be an offence to the eye of the viewer, or impair the quality of the printed image itself.

Still further, in a video camera which has been conventionally known, input timing of sound information is, as described above, at the time of image taking, that is, simultaneous with image taking.

However, also in the digital camera, if sound inputting is limited to the timing of simultaneous with image taking as shown above, discretionary quality of sound information to the printed image, or upgrading or multidimensionalization of the above-described information by combining sound information with print image may sometimes be impaired. For example, in the case of simultaneous input with image taking, it becomes impossible that a plurality of the same images is printed and, at the same time, the respective images are provided with different comments by sound input. Further, if a plurality of taken images can be printing outputted with connected comments or information as sound information while viewing the respective taken images by means of a display or the like after image taking, the above-described upgrading of information or multidimensionalization is even further improved.

SUMMARY OF THE INVENTION

An object of the present invention is to provide an information processing apparatus capable of inputting a taken image with sound information related to the taken image and print outputting the information with the above image.

A further object of the present invention is to provide an information processing apparatus capable of appropriately controlling a print position of sound information in relation to a taken image to prevent a print pattern of the sound information from being an offence to the eye.

A still further object of the present invention is to provide an information processing apparatus capable of inputting sound information related to a taken image at a discretionary timing and print outputting the sound information with the image.

In a first aspect of the present invention, there is provided an information processing apparatus having an image taking function and an image forming function for performing printing on a printing medium, the apparatus comprising:

sound taking means for taking sound information; and printing output control means for, when the image forming function printing outputs an image taken by the image taking function on the printing medium, causing the image forming function to print the sound information as a code data in a part of the image.

With the above construction, since sound information taken by sound taking means is printed as a code data in a part of a printed image when the taken image is printed on a printing medium by an image forming function, a printed result can together hold not only the taken image but also information related thereto.

In a second aspect of the present invention, there is provided an information processing apparatus having an image taking function and an image forming function for performing printing on a printing medium, the apparatus comprising:

sound taking means for taking sound information; and printing output control means for, when the image forming function printing outputs an image taken by the image taking function on the printing medium, causing the image forming function to print the sound information as a code data in a part of the image, a printing position of the code data on the printing medium being changed.

With the above construction, when a taken image is printed on a printing medium, and sound information is printed as code data in part of the printed image, the printing position of the code data can be switched. In particular, since switching is performed according to image taking posture of a camera or the like, even when the printing output position of the printed image relative to the printing medium is changed, the code data can always be outputted to a constant position to the printed image, for example, at a position where the code data is not an offence to the eye of the viewer of the printed image.

In a third aspect of the present invention, there is provided an information processing apparatus having an image taking function and an image forming function for performing printing on a printing medium, the apparatus comprising:

sound taking means for taking sound information;

printing output control means for, when the image forming function printing outputs an image taken by the image taking function on the printing medium, causing the image forming function to print the sound information as a code data in a part of the image; and control means for causing the sound taking means to take the sound information at discretionary timing after taking an image by means of the image taking function and, based on the taken sound information, cause the output control means to control the code data to be printed in the part of the image taken.

With the above construction, since taking of sound information is performed at a discretionary timing after image taking by an image taking function, and code data of the sound information is printed in part of the taken image on a basis of the taken sound information, at any time other than image taking, information related to the printed image can be inputted through sounds and printed.

The above and other objects, effects, features and advantages of the present invention will become more apparent from the following description of embodiments thereof taken in conjunction with the accompanying drawings.

BRIEF DESCRIPTION OF THE DRAWINGS

FIGS. 17A, 17B and 17C are diagrams for explaining print position relations between the above sound code pattern and a taken image with respect to the respective image taking postures shown in FIGS. 16A, 16B and 16C;

DETAILED DESCRIPTION OF THE PREFERRED EMBODIMENTS

The embodiments of the present invention will be described below in detail with reference to the drawings.

In the present specification, "printing" (also referred to as "recording" in some cases) means not only a condition of forming significant information such as characters and drawings, but also a condition of forming images, designs, patterns and the like on printing medium widely or a condition of processing the printing mediums, regardless of significance or unmeaning or of being actualized in such manner that a man can be perceptive through visual perception.

Further, the "printing medium" means not only a paper used in a conventional printing apparatus but also everything capable of accepting inks, such like fabrics, plastic films, metal plates, glasses, ceramics, wood and leathers, and in the following, will be also represented by a "sheet" or simply by a "paper".

Further, in the present specification, a "camera" indicates an apparatus or device that has an image taking function which optically photographs an image and converts the photographed image into electrical signals. Then, it is apparent from a description stated below that the present invention may be applied not only to such camera but also to an information processing apparatus and an information processing system having an apparatus or a device such as a scanner or the like having the image taking function.

Still further, an "ink" (also referred to as "liquid" in some cases) should be interpreted in a broad sense as well as a definition of the above "printing" and thus the ink, by being applied on the printing mediums, shall mean a liquid to be used for forming images, designs, patterns and the like, processing the printing medium or processing inks (for example, coagulation or encapsulation of coloring materials in the inks to be applied to the printing mediums).

Meantime, one example of a printing head employed in embodiments to form an image is that thermal energy is generated by an electro-thermal converter is utilized to cause a film boiling to the liquid resulting in a formation of a bubble and to cause liquid to be ejected by a pressure of the bubble.

[Basic Structure]

Firstly, a basic structure of a device according to the present invention will be explained in view of FIGS. 1 to 14. The device explained the present embodiments is constituted as an information processing equipment comprising a photographing section for optically photographing an image and then converting the photographed image into electric signals (hereinafter, also referred to as "camera section") and an image recording section having a function of forming an image on a basis of thus obtained electric signals (hereinafter, also referred to as "printer section"). Hereinafter, the information processing equipment in the present embodiments is explained in the name of a "printer-built-in camera".

Figure 5:
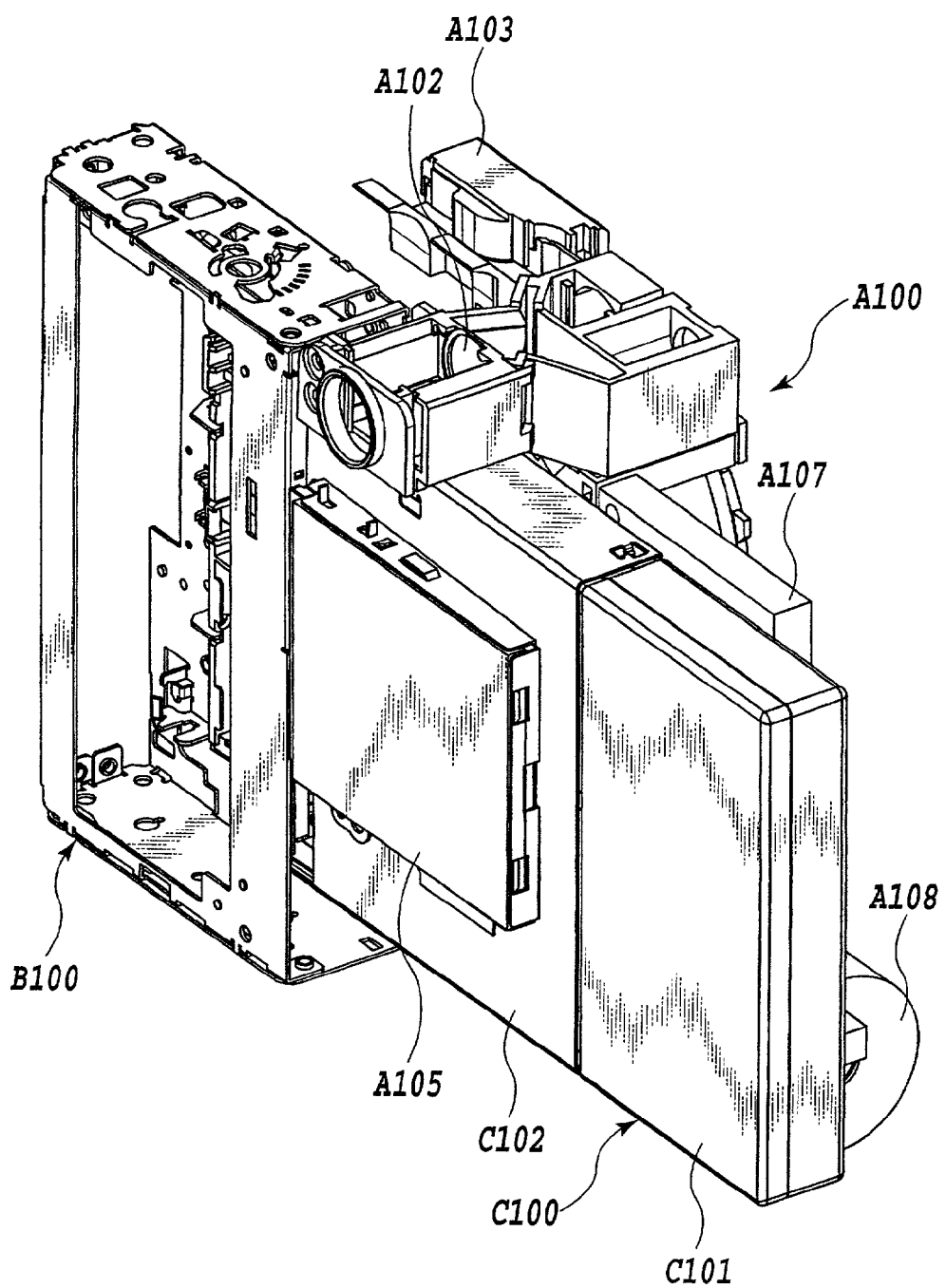
FIG. 5 is a perspective view showing an arrangement of the main components within the camera in FIG. 1.

In a main body A001, there is incorporated a printer section (image forming section) B100 at the backside of a camera section (image taking section) A100 to form one body. The printer section B100 records an image by using inks and printing mediums which are supplied from a medium pack C100. In the present structure, as apparent from FIG. 5 illustrating the main body A001 viewing from the backside with an outer package removed, the medium pack C100 is inserted at the right hand of the main body A001 in FIG. 5 and the printer section B100 is arranged at the left hand of the main body A001 in FIG. 5. In the case of performing a recording by the printer section B100, the main body A001 can be placed facing a liquid crystal display section A105 up and a lens A101 down. In this recording position, a printing head B120 of the printer section B100, which will be described below, is made to be positioned to eject inks in the downward direction. The recording position can be made to be the same position as that of photographing condition by the camera section A100 and thus is not limited to the recording position as mentioned above. However, in view of a stability of a recording operation, the recording position capable of ejecting the inks in the downward direction is preferred.

There follows the explanations of the basic mechanical structure according to the present embodiment under the headings of A as "Camera Section", B as "Medium Pack" and C as "Printer Section", and of the basic structure of the signal processing under the heading of D as "Signal Processing".

A: Camera Section

Figure 1:
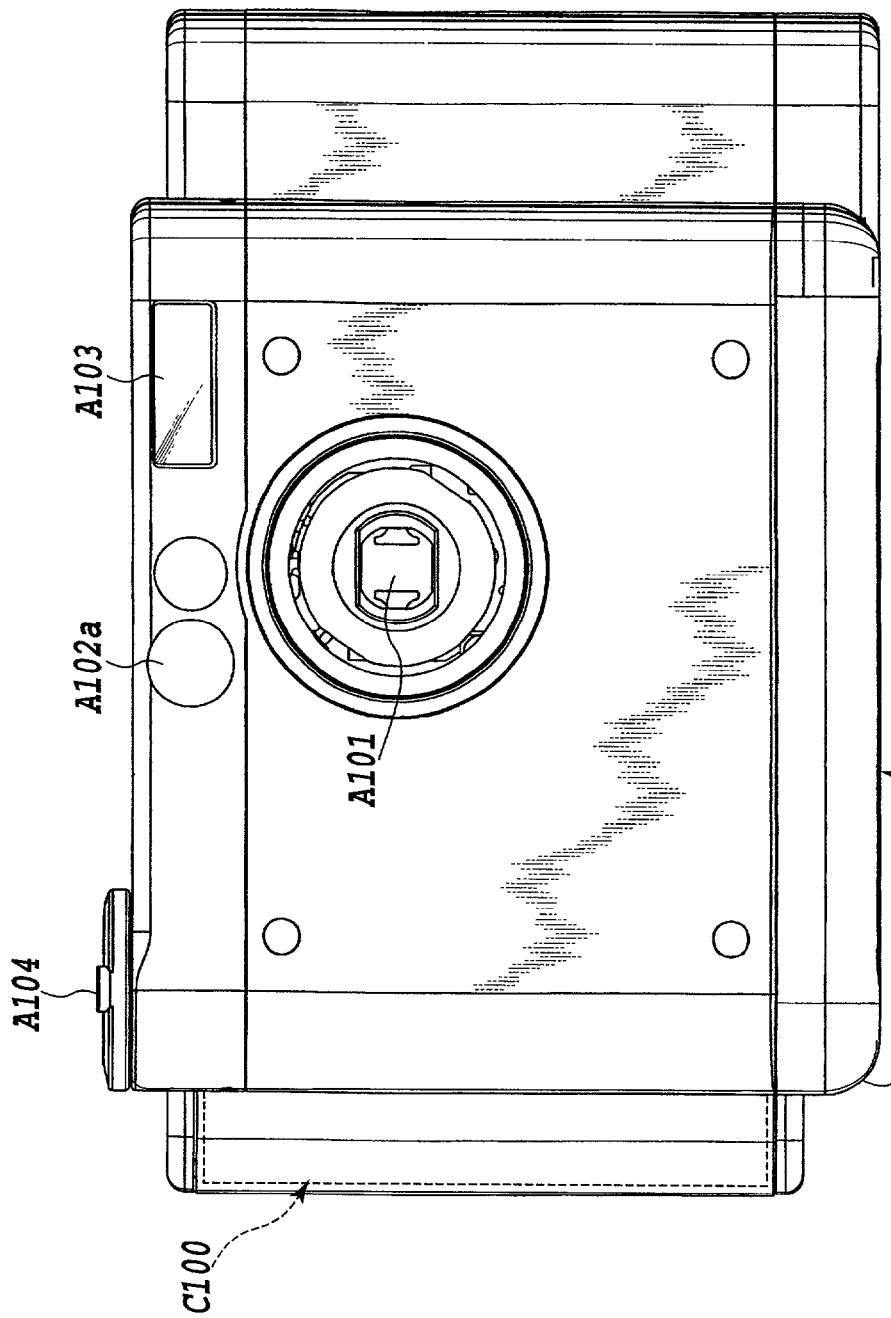
FIG. 1 is a front elevation view of a printer-built-in camera to which the present invention is applicable.
Figure 2:
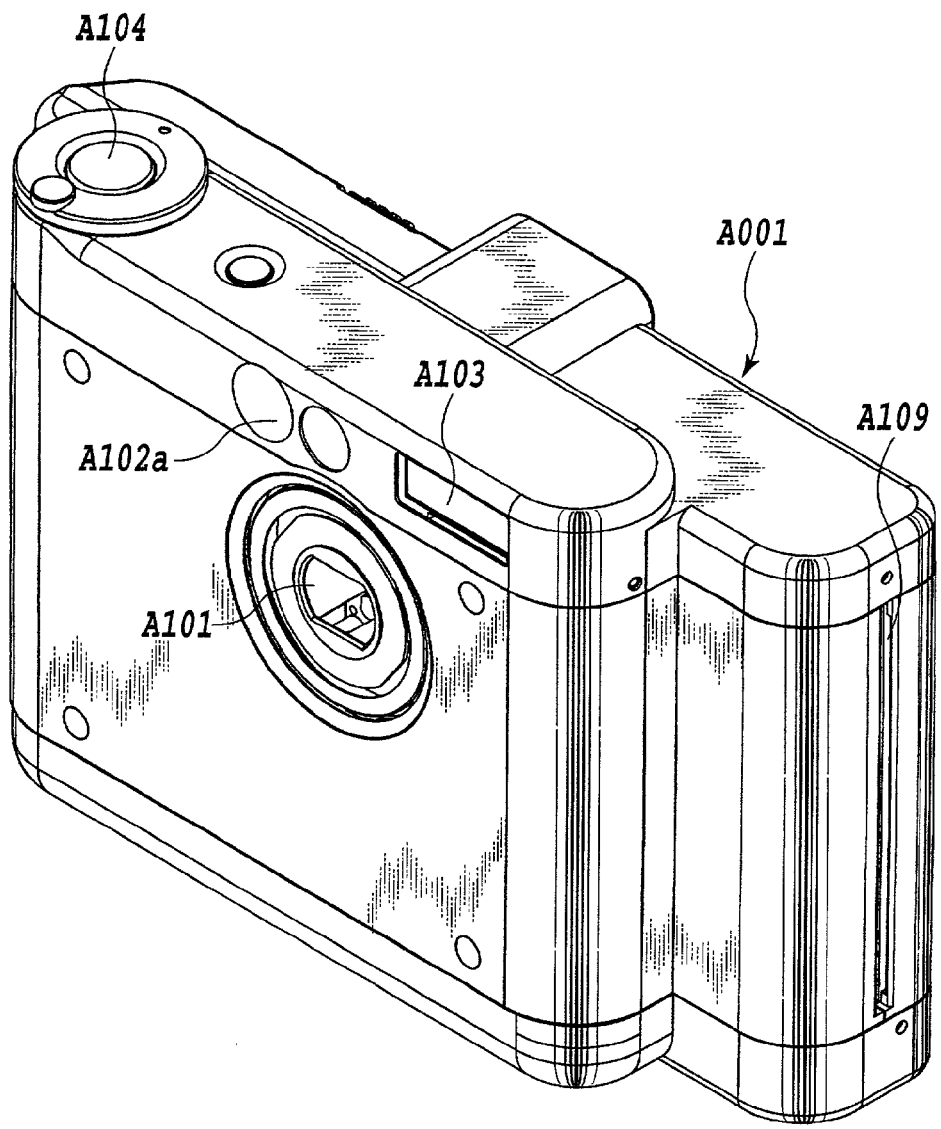
FIG. 2 is a perspective view of the camera in FIG. 1 viewing diagonally from the front thereof.
Figure 3:
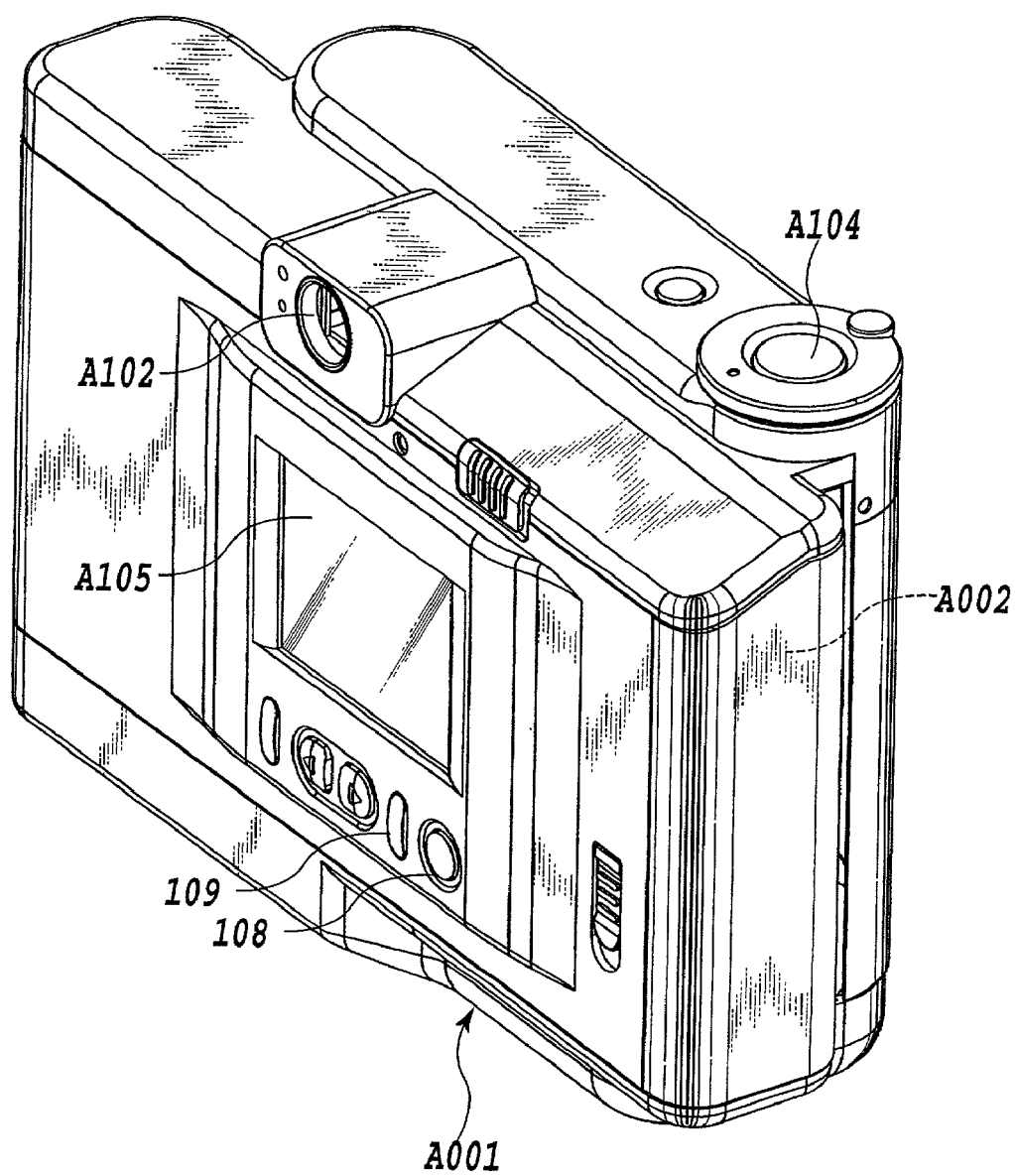
FIG. 3 is a perspective view of the camera in FIG. 1 viewing diagonally from the back thereof.

The camera section A100, which basically constitutes a conventional digital camera, constitutes the printer-built-in digital camera having an appearance in FIGS. 1 to 3 by being incorporated into the main body A001 to form one body together with a printer section B100 described below. In FIGS. 1 to 3, A101 denotes a lens; A102 denotes a viewfinder; A102a denotes a window of the viewfinder; A103 denotes a flash; A104 denotes a shutter release button; and A105 denotes a liquid crystal display section (outer display section). The camera section A100, as described below , performs a processing of data photographed by CCD, a recording of the images to a compact flash memory card (CF card) A107, a display of the images and a transmission of various kinds of data with the printer section B100. A109 denotes a discharge part for discharging a printing medium C104 on which the photographed image is recorded. A108, as shown in FIG. 5, is a battery as a power source for the camera section A100 and the printer section B100.

B: Medium Pack

Figure 4:
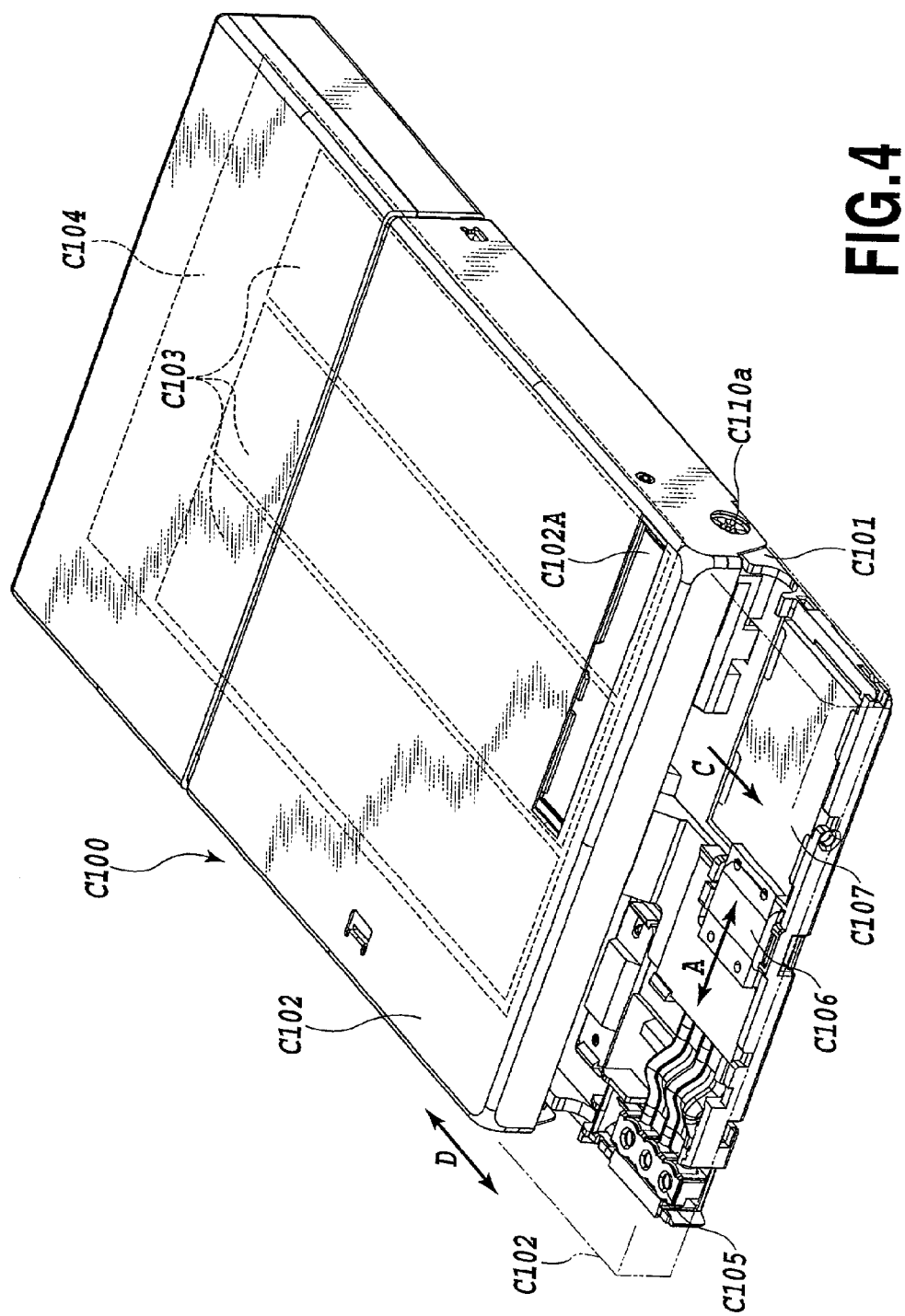
FIG. 4 is a perspective view of a medium pack insertable to the camera in FIG. 1.

A medium pack C100 is detachable relating to a main body A001 and, in the present embodiment, is inserted through an inserting section A002 of the main body A001 (see FIG. 3), thereby being placed in the main body A001 as shown in FIG. 1. The inserting section A002 is closed as shown in FIG. 3 when the medium pack C100 is not inserted therein, and is opened when the medium pack is inserted therein. FIG. 5 illustrates a status wherein a cover is removed from the main body A001 to which the medium pack C100 is inserted. As shown in FIG. 4, a shutter C102 is provided with a pack body C101 of the medium pack C100 in such manner being slidable in an arrow D direction. The shutter C102, which slides to stay at a position indicated by the two-dots-and-dashed lines in FIG. 4 when the medium pack C100 is not inserted in the main body A001, slides to a position indicated by the solid lines in FIG. 4 when the medium pack C100 is placed in the main body A001.

The pack body C101 contains ink packs C103 and printing mediums C104. In FIG. 4, the ink packs C103 are held under the printing mediums C104. In the case of the present embodiment, three ink packs C103 are provided so as to separately hold the inks of Y (yellow), M (magenta) and C (cyan), and about twenty sheets of the printing mediums C104 are stored in pile. A suitable combination of those inks and the printing mediums C104 for recording an image is selected to be stored within the medium pack C100. Accordingly, the various medium packs C100 each having a different combination of the inks and the printing mediums (for example, medium packs for super high-quality image; for normal image; and for sealing (seal partitioning)) are prepared and, according to a kind of images to be recorded and a use of the printing medium on which an image is formed, those medium packs C100 are selectively inserted in the main body A001, thereby being able to perform an ensured recording of the images in compliance with the purpose by employing the most suitable combination of the ink and the printing medium. Further, the medium pack C100 is equipped with the below-mentioned EEPROM to which is recorded the identification data such as kinds or remaining amounts of the inks and the printing mediums contained in the medium pack.

The ink pack C103, upon which the medium pack C100 is inserted in the main body A001, is connected to an ink supplying system described later in the main body A001, through three joints C105 each corresponding to the respective inks of Y, M and C. On the other hand, the printing mediums C104 are separated one by one using a separating mechanism which is not shown in the figures and then sent to a direction of an arrow C by a paper feeding roller C110 (see FIG. 9). A driving force of the paper feeding roller C110 is supplied from an after-mentioned conveying motor M002 (see FIG. 9) provided on the main body A001 through a connecting portion C110a.

Further, the pack body C101 comprises a wiper C106 for wiping a printing head of the after-mentioned printer section, and an ink absorption body C107 for absorbing the abolished inks discharged from the printer section. The printing head in the printer section reciprocates in a direction of the main scanning direction as indicated by an arrow A in such manner describing below. When the medium pack C100 is in the status of being removed from the main body A001, the shutter C102 slides to a position indicated by the two-dots-and-dashed lines in FIG. 4 to protect the joints C105, the wiper C106, the ink absorbing body C107 and so on.

C: Printer Section

The printer section B100 according to the present embodiment is a serial type employing an ink jet printing head. This printer section B100 is explained under the headings of C-1 "Printing Operating Section"; C-2 "Printing Medium Carrying"; and C-3 "Ink Supplying System", respectively.

C-1: Printing Operating Section

Figure 6:
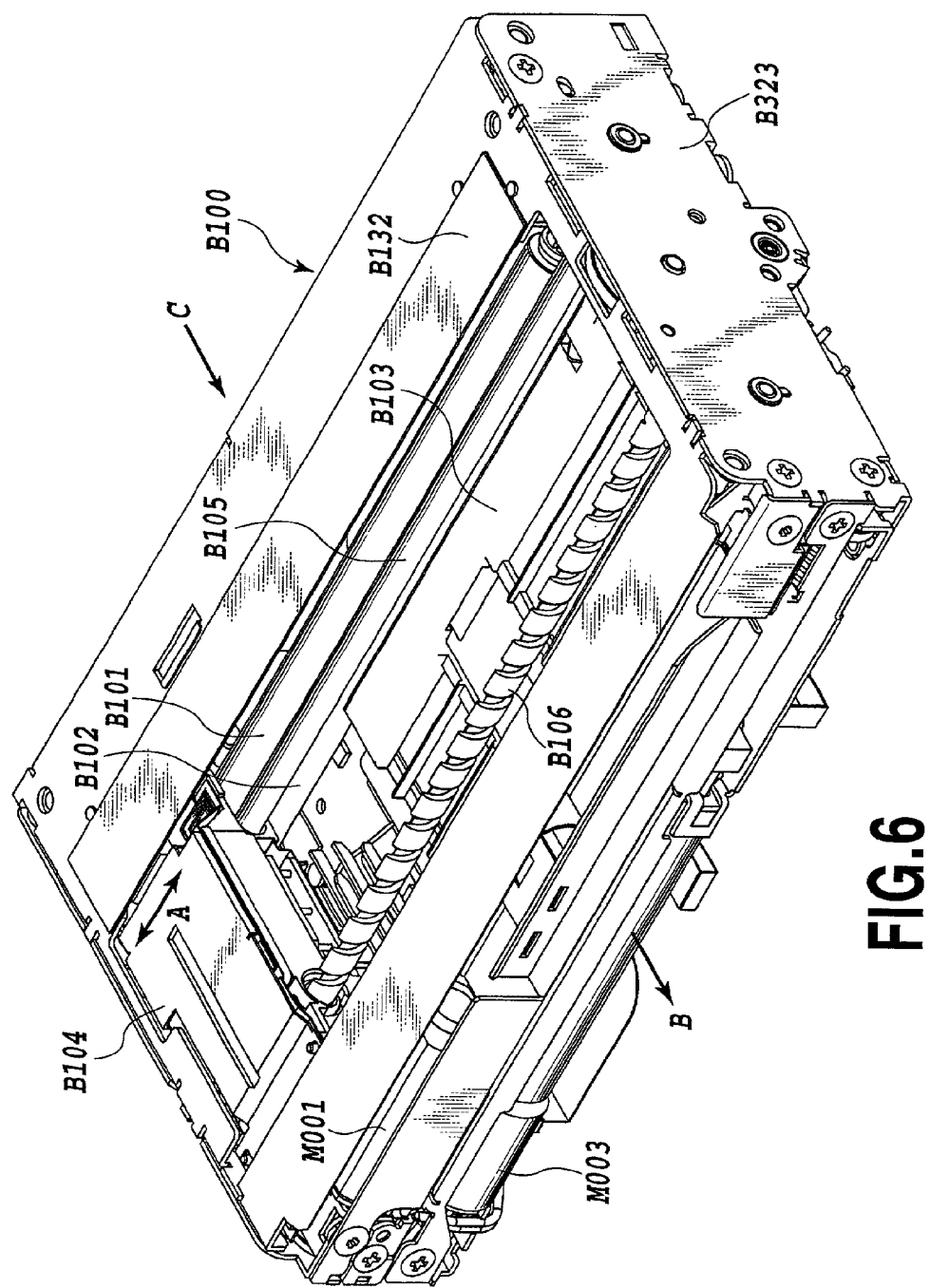
FIG. 6 is a perspective view of a printer section in FIG. 5.
Figure 7:
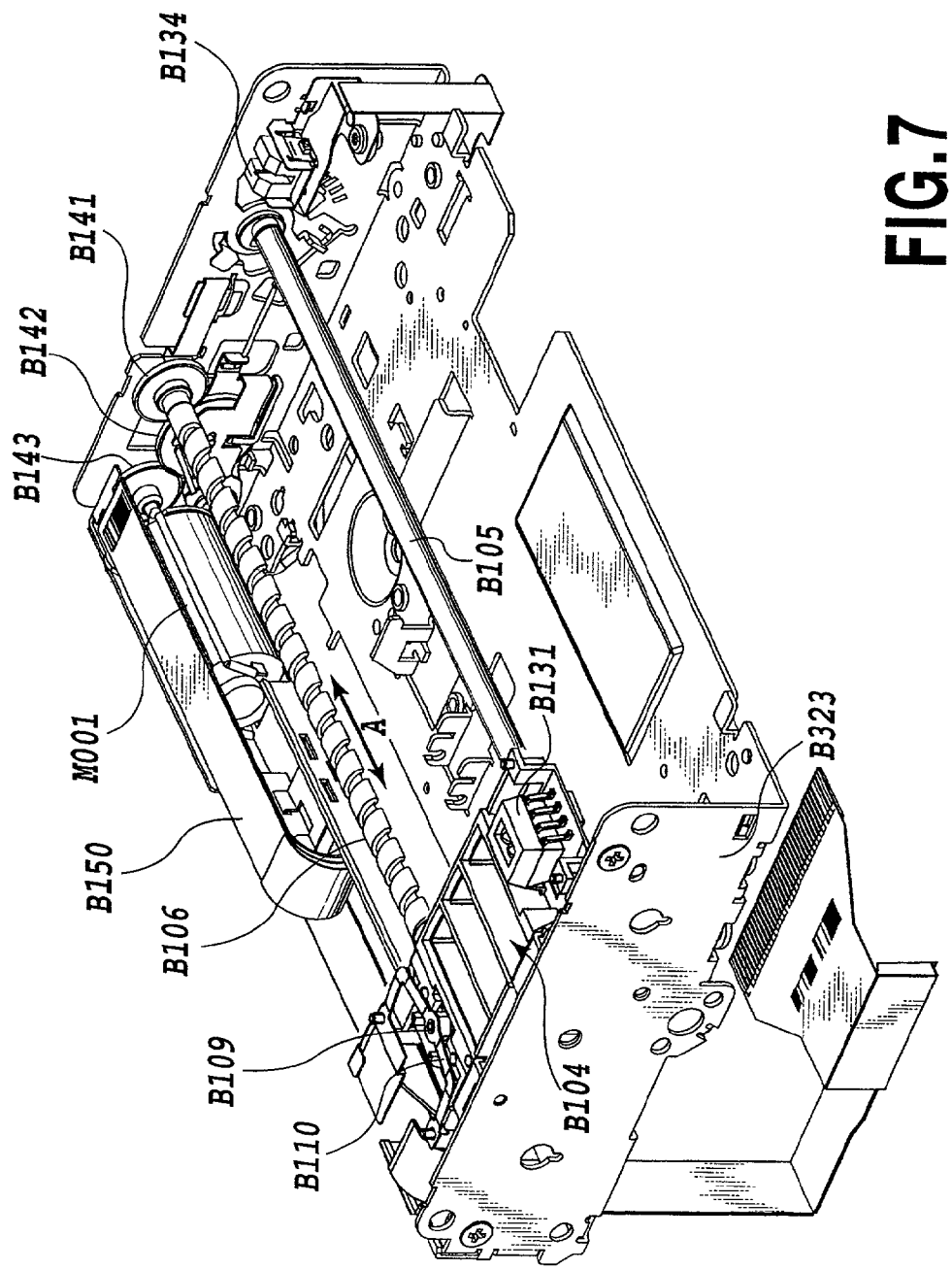
FIG. 7 is a perspective view in which a portion of the printer section in FIG. 6 is dislodged.

FIG. 6 is a perspective view illustrating the entire printer section B100, and FIG. 7 is a perspective view illustrating the printer section B100 with a part partially taken out.

At a predetermined position in the main body of the printer section B100, a tip portion of the medium pack C100 is positioned when the medium pack C100 is placed in the main body A001 as shown in FIG. 5. The printing medium C104 sent to the direction of an arrow C from the medium pack C100, while being sandwiched between an LF roller B101 and an LF pinch roller B102 of the below-mentioned printing medium carrying system, is carried in the sub-scanning direction indicated by an arrow B on a pressure plate B103. B104 denotes a carriage which reciprocates toward a main scanning direction indicated by an arrow A along a guiding shaft B105 and a leading screw B106.

Figure 8:
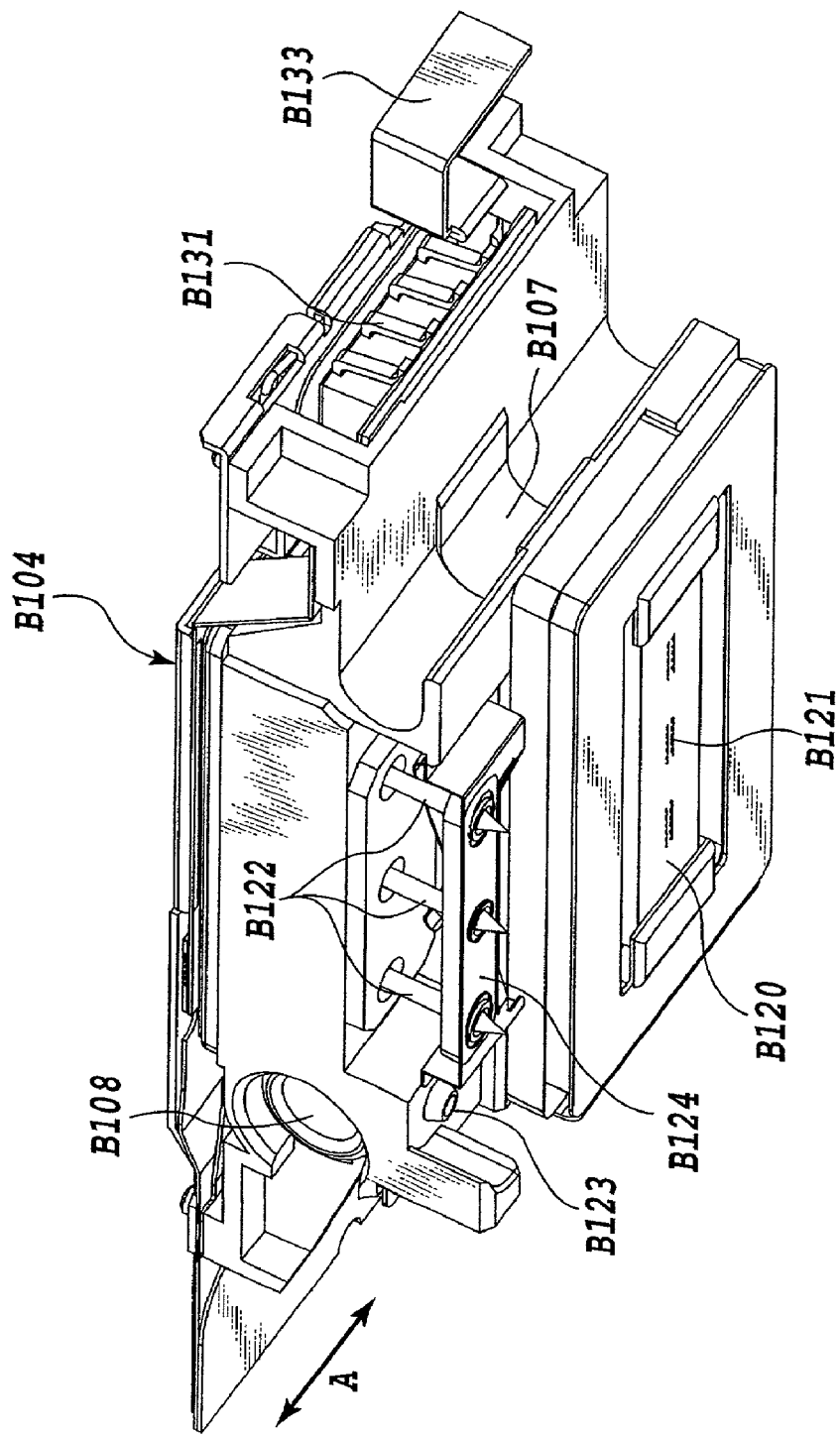
FIG. 8 is a perspective view of a carriage of the printer in FIG. 6.

As shown in FIG. 8, the carriage B104 is provided with a bearing B107 for a guiding shaft B105 and a bearing B108 for a leading screw B106. At a fixed position of the carriage B104, as shown in FIG. 7, a screw pin B109 projecting toward an interior of the bearing B108 is installed by a spring B110. A fit of a tip of the screw pin B109 to a helical thread formed on the outer circumference of the leading screw B106 converts a rotation of the leading screw B106 to a reciprocating movement of the carriage B104.

The carriage B104 is equipped with an ink jet printing head B120 capable of ejecting the inks of Y, M and C, and a sub-tank (not shown) for reserving inks to be supplied to the printing head B120. On the printing head B120, a plurality of ink ejection openings B121 (see FIG. 8), which are aligned with the direction crossing with the main scanning direction indicated by the arrow A (in the present embodiment, an orthogonal direction), are formed. The ink ejection openings B121 form nozzles capable of ejecting inks supplied from the sub-tank. As a generating means of energy for discharging the inks, an electro-thermal converting element equipped with each of the nozzles may be used. The electro-thermal converting element generates bubble in the inks within the nozzle by a heating and thus generated foaming energy causes an ejection of the ink droplet from the ink ejection opening B121.

The sub-tank has a capacity smaller than the ink packs C103 contained in the media pack C100 and made to be a sufficient size for storing a required amount of ink for recording an image corresponding to at least one sheet of printing medium C104. In the sub-tank, there are ink reserving sections for each of the inks of Y, M and C, on each of which is formed the ink supplying section and the negative pressure introducing sections, wherein those ink supplying sections are individually connected to the corresponding three hollow needles B122 and those negative pressure introducing sections are also connected to a common air suction opening B123. Such ink supplying sections, as will be mentioned below, are supplied with inks from the ink packs C103 in the medium pack C100 when the carriage B104 moves to a home position as illustrated in FIG. 6.

In the carriage B104 in FIG. 8, B124 denotes a needle cover which is moved to a position for protecting the needles B122 by the force of the springs as illustrated in FIG. 8 when the needles B122 and the joints C105 are not mated with each other, and which releases a protection of the needles B122 by being pushed upwardly against the force of the springs in FIG. 8 when the needles B122 and the joints C105 are mated with each other. A movement position of the carriage B104 is detected by an encoder sensor B131 on the carriage B104 and a linear scale B132 (see FIG. 6) on the main body of the printer section B100. Also, a fact that the carriage B104 moves to the home position is detected by an HP (home position) flag B133 on the carriage B104 and an HP sensor B134 (see FIG. 7) on the main body of the printer section B100.

In FIG. 7, at the both ends of the guiding shaft B105, supporting shafts (not shown) are provided at a position eccentric to the center axis of the guiding shaft. The guiding shaft B105 is turned and adjusted upon the supporting shaft, thereby controlling a height of the carriage 104, resulting in achieving an adjustment of a distance between the printing head B120 and the printing medium C104 on the pressure plate B103. The leading screw B106 is rotatably driven by a carriage motor M001 through a screw gear B141, an idler gear B142 and a motor gear B143. B150 denotes a flexible cable for electrically connecting the after-mentioned controlling with the printing head B120.

The printing head B120 moves together with the carriage B104 toward the main scanning direction indicated by the arrow A and concurrently ejects the inks from the ink ejection openings B121 in accordance with the image signals, thereby recording an image corresponding to one band on the printing medium on the pressure plate B103. An alternate repeat of a recording operation of an image corresponding to one band by such printing head B120 and a conveying operation of the predetermined amount of the printing medium toward the sub-scanning direction indicated by the arrow B by means of the below-mentioned printing medium conveying system enables a sequential recording of the images on the printing medium.

C-2: Printing Medium Carrying

Figure 9:
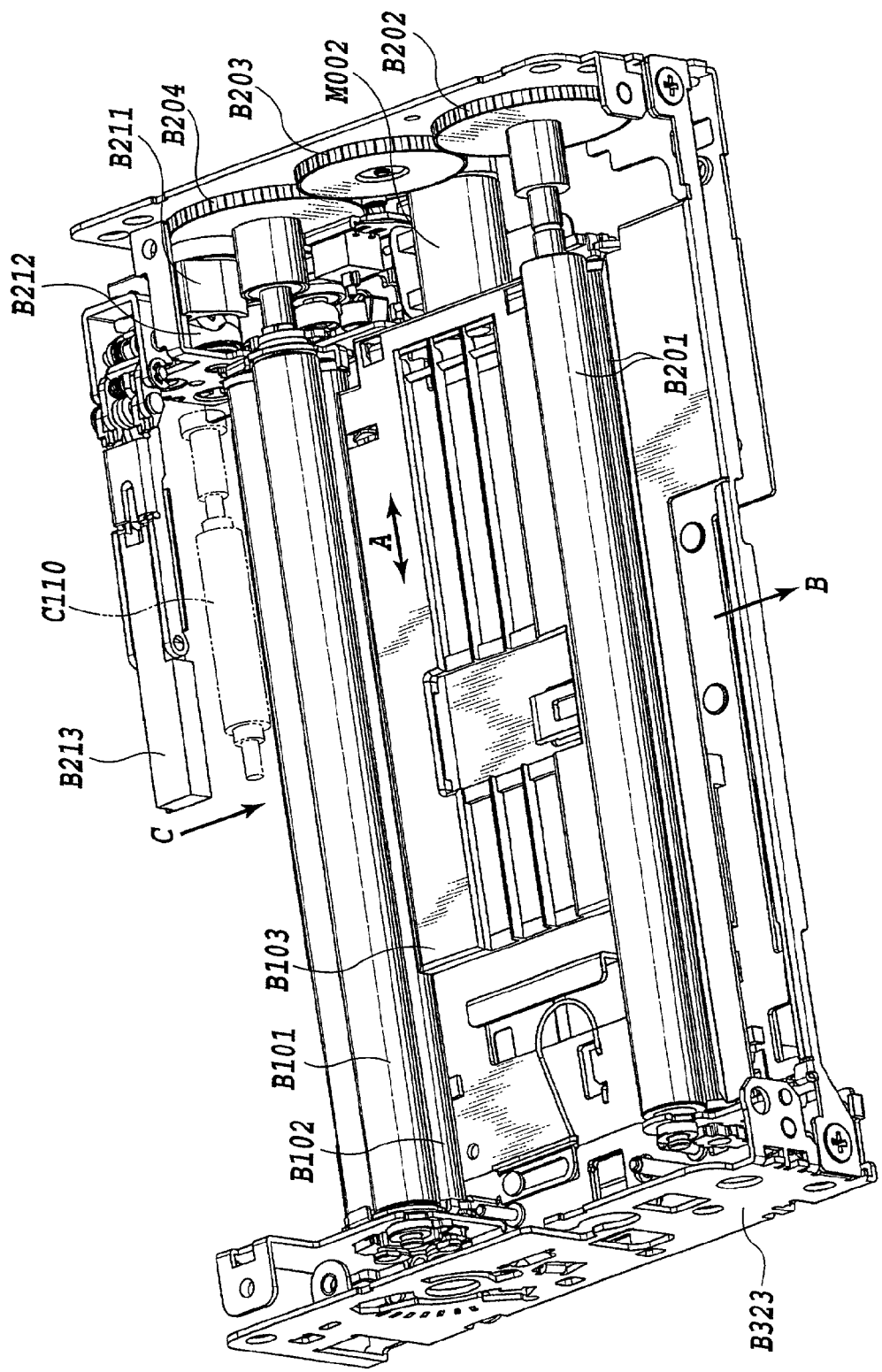
FIG. 9 is a perspective view of a component part of a printing medium carrying of the printer section in FIG. 6.

FIG. 9 is a perspective view showing a component of the printing medium conveying system of the printer section B100. In FIG. 9, B201 denotes a pair of paper delivering rollers, and the upper one of the paper delivering rollers B201 in FIG. 9 is driven by a conveying motor M002 through the paper delivering roller gear B202 and a junction gear B203. Likewise, the aforementioned LF roller B101 is driven by the conveying motor M002 through a LF roller gear B204 and the junction gear B203. The paper delivering roller B201 and the LF roller B101 convey the printing medium C104 toward the sub-scanning direction indicated by the arrow B by a driving force of the conveying motor M002 rotating in the forward direction.

On the other hand, when the conveying motor M002 counter-rotates, a pressure plate head B213 and a locking mechanism which is not shown are driven through a switching slider B211 and a switching cam B212, while a driven force is transmitted to the paper feeding roller C110 on the medium pack C100. That is, the pressure plate head B213 pressurizes the printing mediums C104, which are piled up within the medium pack C100, in a downward direction in FIG. 4 by a driven force caused by a reverse rotation of the carrying motor M002, through a window portion C102A (see FIG. 4) of a shutter C102 of the medium pack C100. As a result thereof, the printing medium C104 positioned at the lowest position in FIG. 4 is pressed against the feeding roller C110 in the medium pack C100. Also, the locking mechanism which is not shown locks the medium pack C100 to the main body A001 to inhibit a removal of the medium pack C100. The feeding roller C110 of the medium pack C100 feeds one piece of the printing medium C104 at the lowest position in FIG. 4 toward the direction indicated by the arrow C as a result that the driven force caused by the reverse rotation of the conveying motor M002 is transmitted.

As stated above, only one piece of printing medium C104 is taken out from the medium pack C100 toward the direction indicated by the arrow C by the reverse rotation of the conveying motor M002, and then a forward rotation of the conveying motor M002 conveys the printing medium C104 to the direction indicated by the arrow B.

C-3: Ink Supplying System

Figure 10:
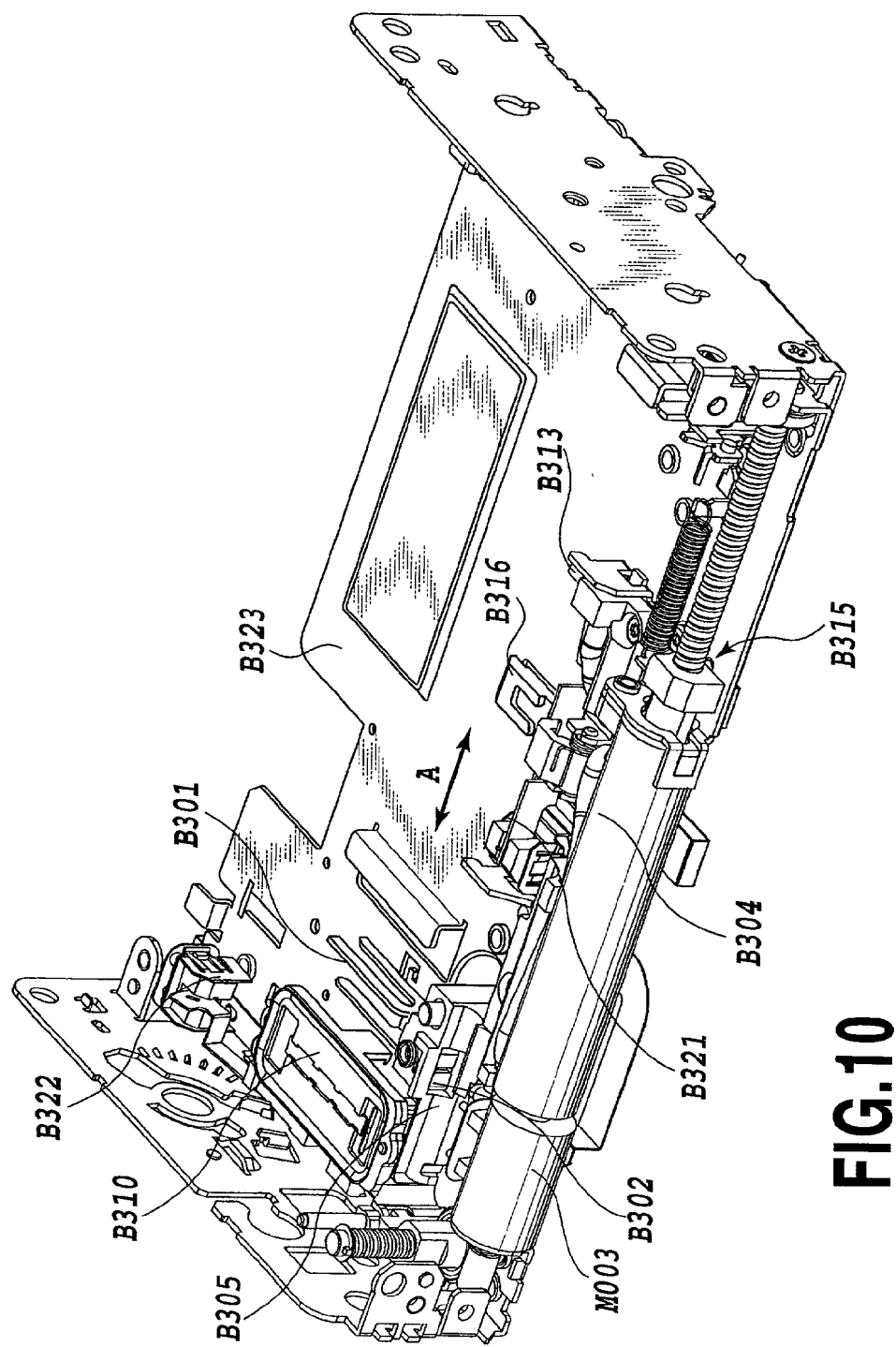
FIG. 10 is a perspective view of a component part of the ink supplying of the printer section in FIG. 6.
Figure 11:
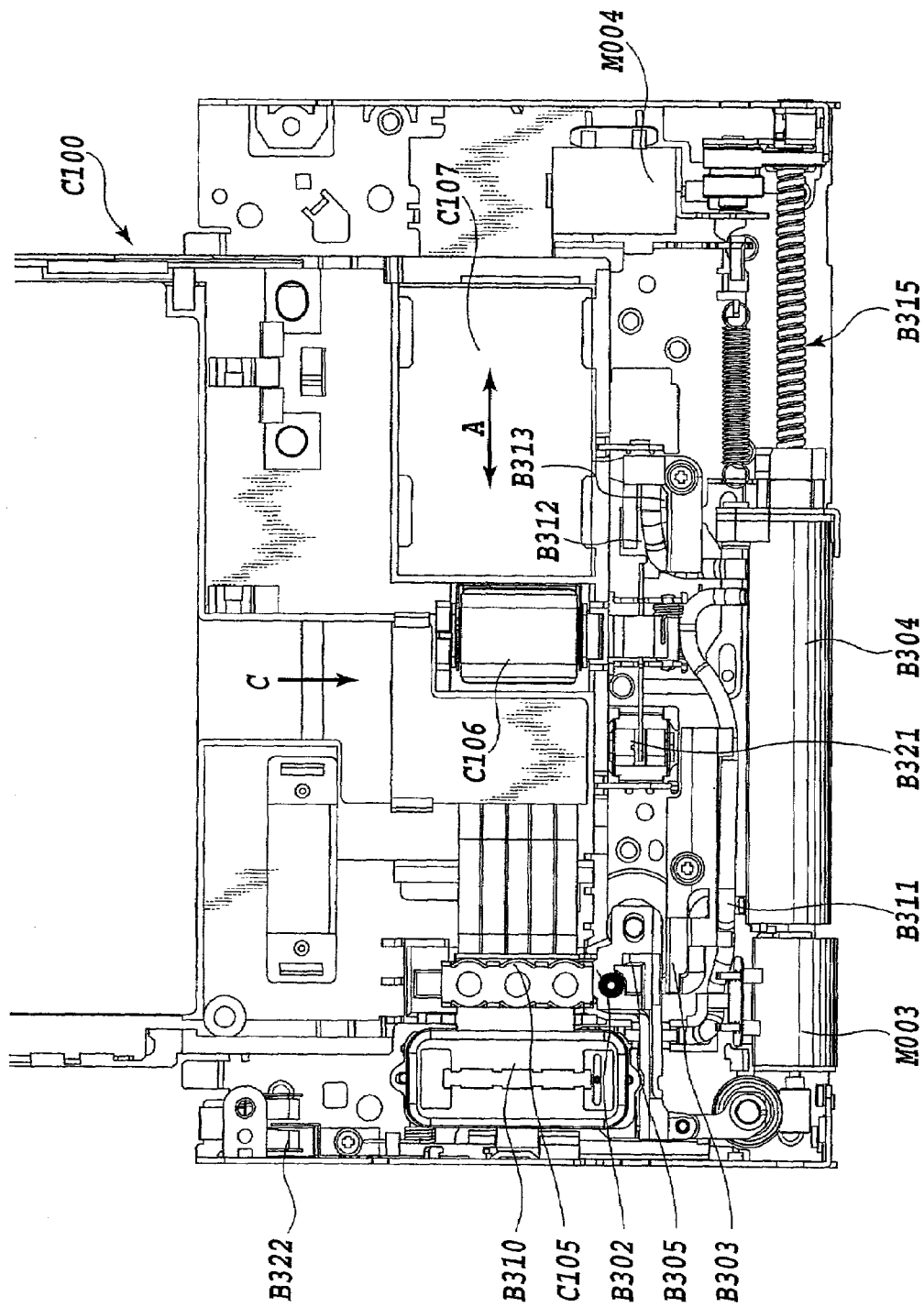
FIG. 11 is a plan view illustrating that the medium pack is inserted into a component part of the ink feeding in FIG. 10.

FIG. 10 is a perspective view showing a component part of an ink supplying system of the printer section B100; FIG. 11 is a plane view showing a status that the medium pack C100 is inserted in the component part of the ink supplying system.

A joint C105 of the medium pack C100 installed to the printer section B100 is positioned below the needles B122 (see FIG. 8) on the carriage B104 moved to a home position. The main body of the printer section B100 is equipped with a joint fork B301 (see FIG. 10) positioned below a joint C105, and an upward movement of the joint C105 caused by the joint fork B301 establishes a connection of the joint C105 to the needles B122. As a result thereof, an ink supplying path is formed between the ink packs C103 in the medium pack C100 and the ink supplying sections on the sub-tank on the carriage B104. Further, the main body of the printer section B100 is equipped with a suction joint B302 positioned below an air suction opening B123 (see FIG. 8) of the carriage B104 moved to the home position. This suction joint B302 is connected to a pump cylinder B304 of a pump serving as a negative pressure generating source, through a suction tube B304. The suction joint B302 is connected to the air suction opening B123 on the carriage B104 according to the upward movement caused by a joint lifter B305. In the light of the foregoing, a negative pressure introducing path, between a negative pressure introducing section of the sub-tank on the carriage B104 and the pump cylinder B304, is formed. The joint lifter B305 makes the joint fork B301 move up and down together with the suction joint B302 by a driving power of the joint motor M003.

The negative pressure introducing section of the sub-tank is equipped with a gas-liquid partition member (not shown) which allows a passing through of air but prevents a passing through of the inks. The gas-liquid partition member allows a passing through of the air in the sub-tank to be suctioned through the negative pressure introducing path, and as a result, an ink is supplied to the sub-tank from the medium pack C100. Then, when the ink is sufficiently supplied to the extent that the ink in the sub-tank reaches to the gas-liquid partitioning member, the gas-liquid partitioning member prevents the passing through of the inks, thereby automatically stopping a supply of the inks. The gas-liquid partitioning member is equipped with the ink supplying section in the ink storing sections for the respective inks in the sub-tank, and thus the ink supplying is automatically stopped with respect to each ink storing section.

The main body of the printer section B100 is further equipped with a suction cap B310 capable of capping with respect to the printing head B120 (see FIG. 8) on the carriage B104 which moved to the home position. The suction cap B310 is introduced the negative pressure thereinto from the pump cylinder B304 through suction tube B311, so that the inks can be suctioned and emitted (suction recovery processing) from the ink ejection openings B121 of the printing head B120. Further, the printing head B120, as required, makes the ink, which does not contribute to a recording of an image, ejection into the suction cap B310 (preliminary ejection processing). The ink within the suction cap B310 is discharged into the ink absorption body C107 in the medium pack C110 from the pump cylinder B304 through a waste water liquid tube B312 and a waste liquid joint B313.

The pump cylinder B304 constitutes a pump unit B315 together with a pump motor M004 for enabling a reciprocating drive of the pump cylinder. The pump motor M004 also functions as a driving source by which a wiper lifter B316 (see FIG. 10) is moved up and down. The wiper lifter B316 makes the wiper C106 of the medium pack C100 placed in the printer section B100 move upwardly, thereby displacing the wiper C106 to a position capable of a wiping of the printing head B120.

In FIGS. 10 and 11, B321 denotes a pump HP sensor for detecting if an operating position of the pump, which is constituted by the pump cylinder B304, lies at the home position. Further, B322 denotes a joint HP sensor for detecting if the aforementioned ink supplying path and the negative pressure introducing path were formed. Still further, B323 denotes a chassis for constituting a main body of the printer section B100.

D: Signal Processing

Figure 12:
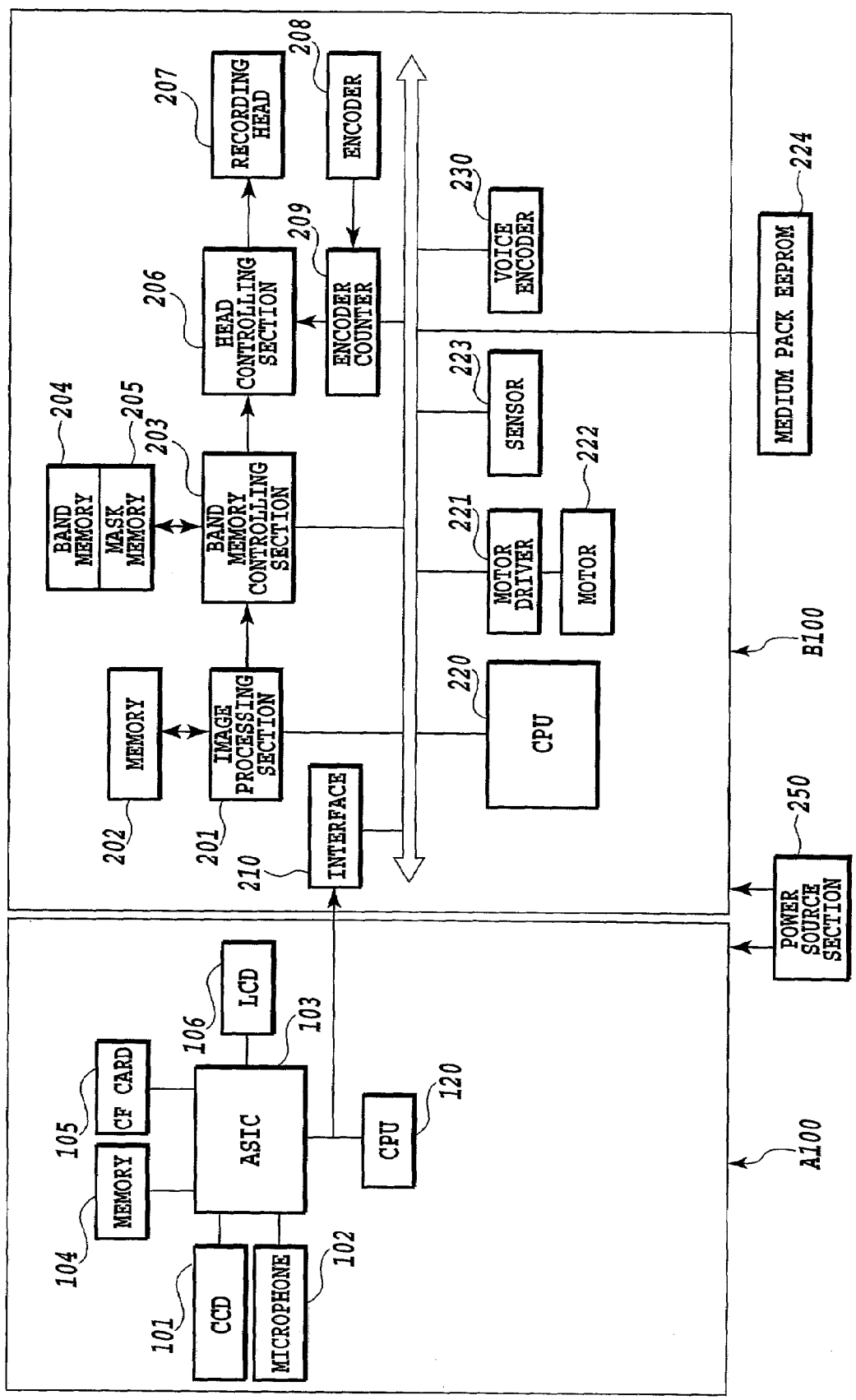
FIG. 12 is a block schematic diagram of the camera section and the printer section of the camera in FIG. 1.

FIG. 12 is a block diagram generally showing the camera section A100 and the printer section B100.

In the camera section A100, 101 denotes a CCD as an image taking element inputting an image through an optical system; 102 denotes a microphone for inputting voice of a user or a person or the like as a subject; 103 denotes an ASIC (Application Specific IC) for performing various hardware processing in the camera section; 104 denotes a first memory for temporarily storing an image date input by the CCD 101 and the like; 105 denotes a CF (compact flash) card (corresponding to a "CF card A107") for recording the photographed image; 106 denotes an LCD (corresponding to a "liquid crystal display section A105") which displays the photographed image or a replayed image; and 120 denotes a first CPU for controlling the camera section A100.

On the other hand, in the printer section B100, 210 denotes an interface between the camera section A100 and the printer section B100; 201 denotes an image processing section (including a binary processing section for binarizing an image); 202 denotes a second memory to be used in performing the image processing; 203 denotes a band memory controlling section; 204 denotes a band memory; 205 denotes a mask memory; 206 denotes a head controlling section controlling driving of the printing head; 207 denotes a printing head (corresponding to the "printing head B120"); 208 denotes an encoder (corresponding to the "encoder sensor B131") outputting a signal of scanning position of the printing head; 209 denotes an encoder counter outputting a signal for controlling ink ejection timing based on the signal of scanning position; 220 denotes a second CPU for controlling the printer section B100; 221 denotes motor drivers controlling driving of motors for driving the carriage and the like; 222 denotes these motors (corresponding to the motors M001, M002, M003 and M004"); 223 denotes sensors (including the "HP sensors B134, B321 and B322"); 224 denotes an EEPROM contained in the medium pack C100; 230 denotes a voice encoder section and 250 denotes a power source section for supplying electric power to the entire device (corresponding to the "battery A108").

Further, the printer-built-in camera of the embodiment is provided with a posture sensor, not shown in FIG. 12, for detecting image taking postures in the camera section A100. As the posture sensor, well known sensor such as a sensor in which a conductive medium moves in accordance with the posture of the camera to detect the posture of the camera can be employed. Then, the CPU 120, based on detected information from the posture sensor, determines a printing position of a sound code data as described by referring to FIG. 17.

Figure 19:
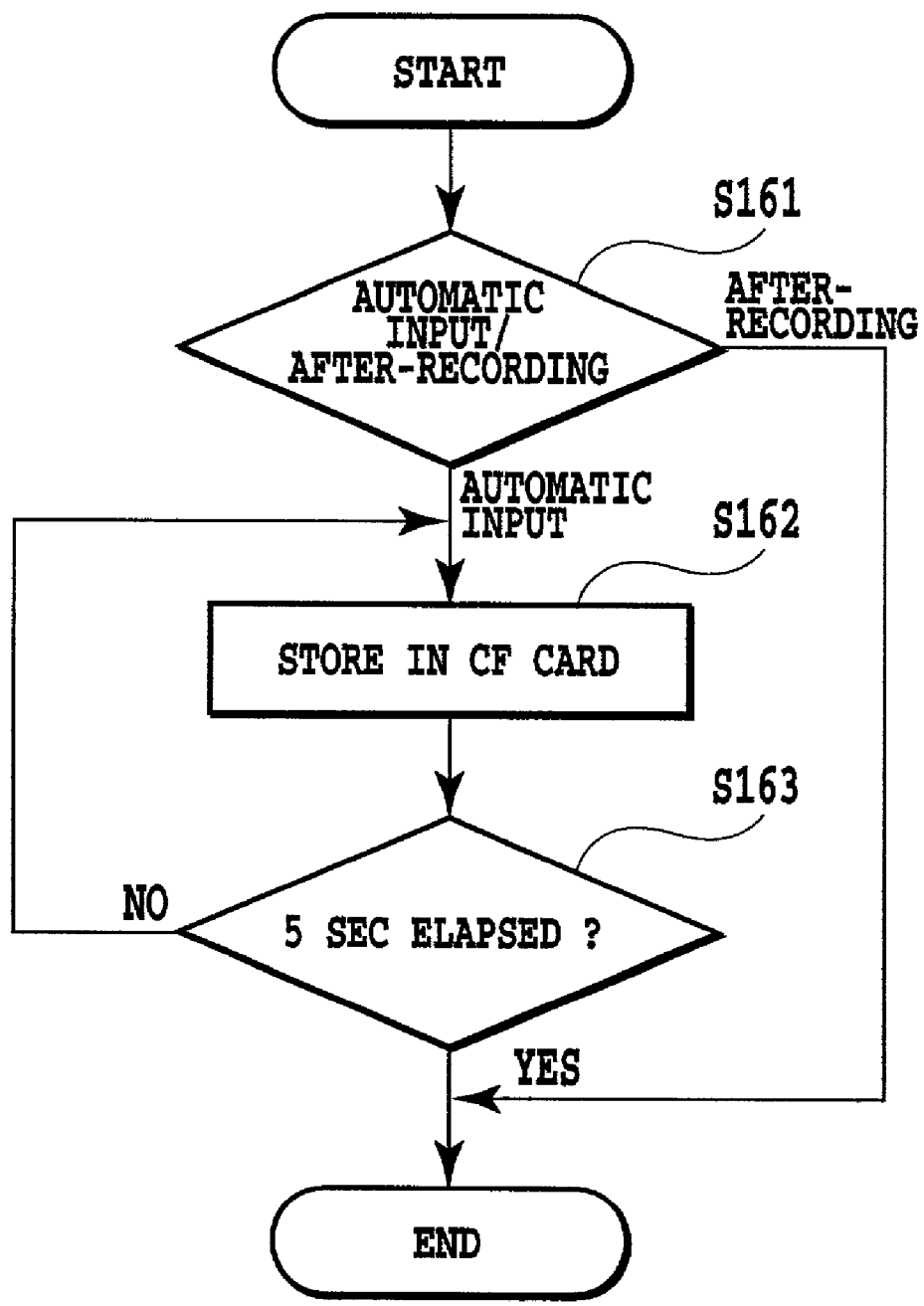
FIG. 19 is a flow chart showing processing relating to sound input at the time of image taking according to an embodiment of the present invention.
Figure 20:
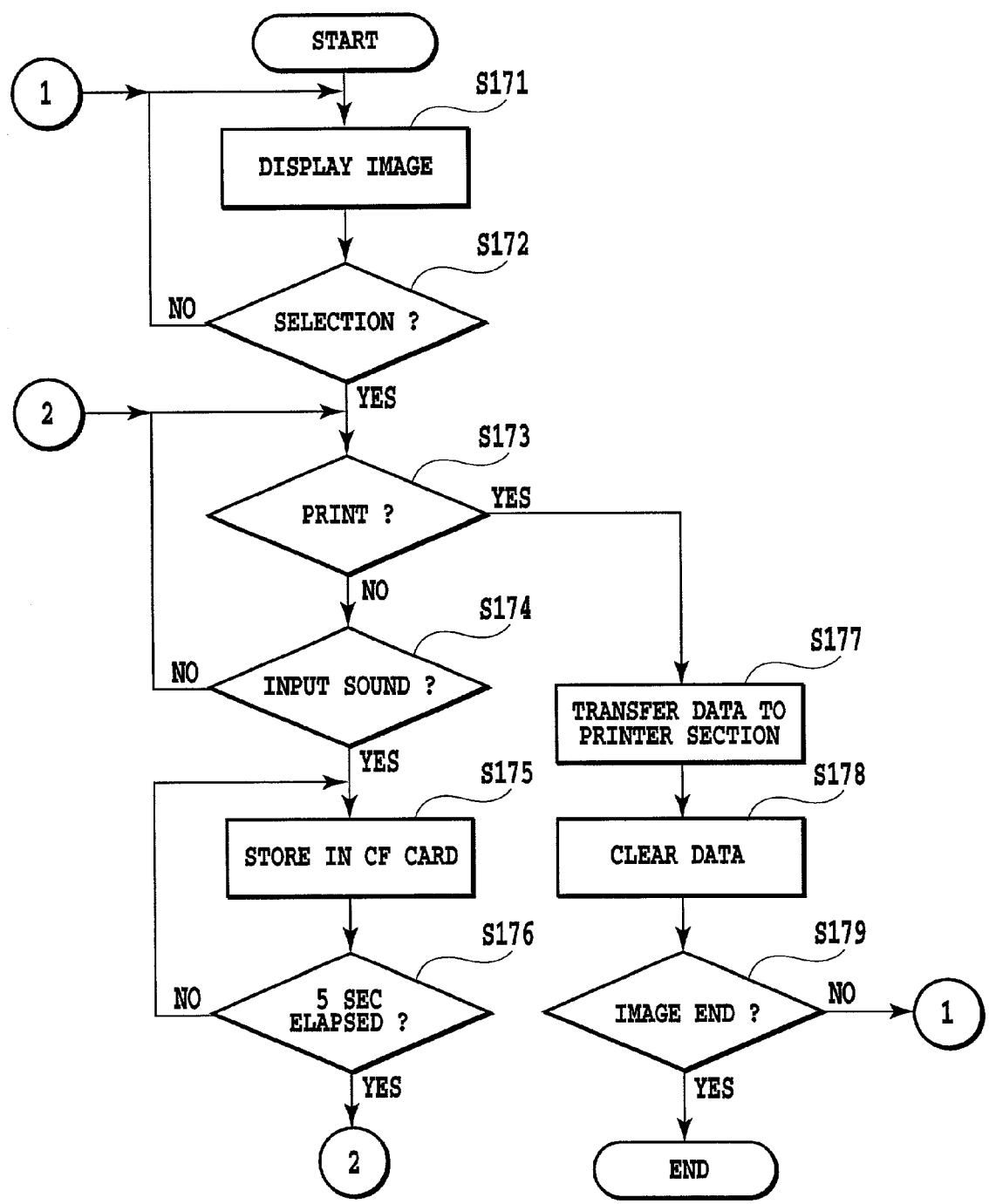
FIG. 20 is a flow chart showing processing relating to sound input at a discretionary timing according to an embodiment of the present invention.

In addition, the CPU 120 of the camera section A100 executes processing relating to inputting of a sound as described by referring to FIGS. 19 and 20.

Figure 13:
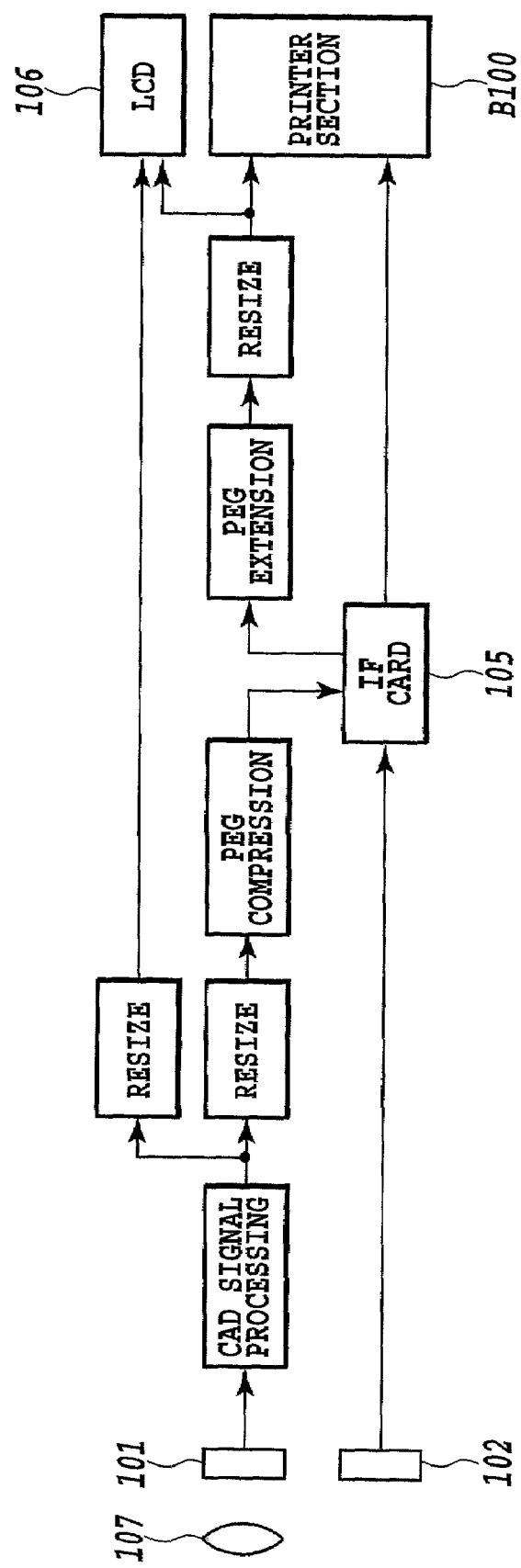
FIG. 13 is a schematic diagram of a signal processing performed in the camera section in FIG. 12.

FIG. 13 is a schematic diagram showing a signal processing in the camera section A100. In a photographing mode, an image photographed by the CCD 101 through a lens 107 is signal-processed (CCD signal processing) by ASIC 103 and then is converted to YUV intensity with two-color-different signal. Further, the photographed image is resized to a predetermined resolution and stored on a CF card 105 using a compression method by JPEG, for example.

On the other hand, a voice is inputted through a microphone 102 and sound information of the voice is stored in the CF card 105 through the ASIC 103. The recording of the voice can be performed in such manner that recording is performed at the same time of photographing, or after photographing as so called an after-recording.

In a replay mode, the JPEG image is read out from the CF card 105, extended by the JPEG through the ASIC 103 and further resized to be a resolution for displaying, thereby being displayed on the LCD 106. Further, the sound data stored in the CF card is similarly read out to be transferred to the printing section so as to be printed in the form of the code data.

Figure 14:
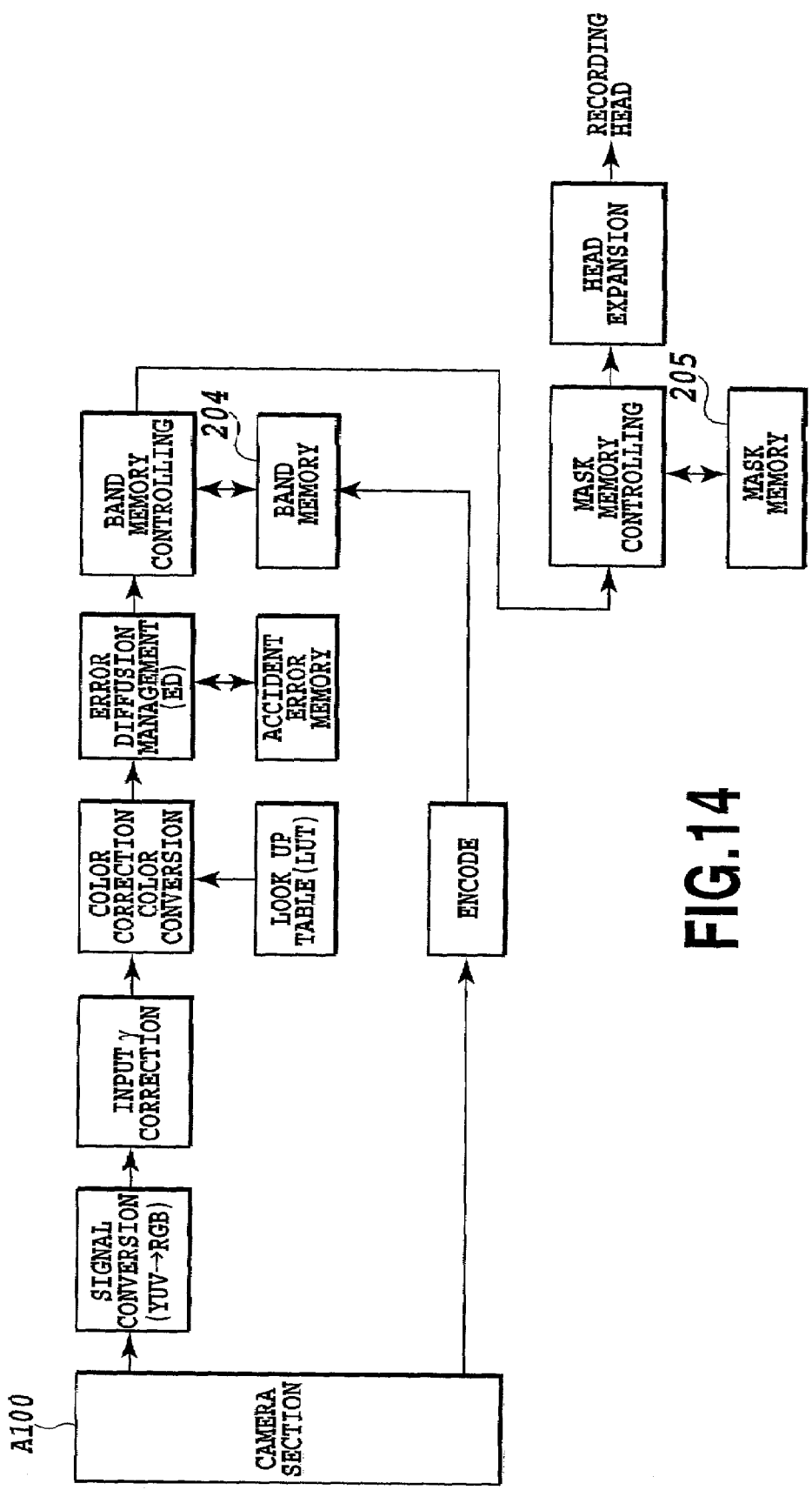
FIG. 14 is a schematic diagram of a signal processing performed in the printer section in FIG. 12.

FIG. 14 is a schematic diagram showing a signal processing performed in the printer section B100.

An image replayed on the camera section A100, that is the image being read out from the CF card 105, is extended by the JPEG as shown in FIG. 13 to resize a resolution to a suitable size for printing. Then, the resized image data (YUV signal), through an interface section 210, is transferred to the printer section B100. As shown in FIG. 14, the printer section B100 performs an image processing of an image data transferred from the camera section A100 by an image processing section 201, thereby performing a conversion of the image data to an RGB signal, and input γ correction in accordance with the features of a camera, a color correction and a color conversion using a look up table (LUT), and a conversion to a binarized signal for printing. When performing the binarizing processing, in order to perform an error diffusion (ED), a second memory 202 is utilized as an error memory. In the case of the present embodiment, though a binarizing processing section in the image processing section 201 performs the error diffusion processing, other processing may be performed such as a binarizing processing using a dither pattern. The binarized printing data is stored temporarily in the band memory 204 by a band memory controlling section 203. An encoder pulse from the encoder 208 enters into the encoder counter 209 of the printer section B100 every time the carriage B104 carrying the printing head 207 and the encoder 208 moves a certain distance. Then, in sync with this encoder pulse, a printing data is read out from the band memory 204 and the mask memory 205, and, based on thus obtained printing data, the head controlling section 206 controls the printing head 207 to perform a recording.

A band memory shown in FIG. 14 is explained as below.

A plurality of nozzles in the printing head 207, for example, is formed in array so as to achieve a density of 1200 dpi (dots/inch). For recording the image by using such printing head 207, upon performing one scanning by the carriage, it is preferred to previously prepare a recording data (a recording data corresponding to one scanning) corresponding to the number of nozzles in the sub-scanning direction (hereinafter, also referred to as a "column (Y direction)") and a recording data corresponding to the recording area in the scanning direction (hereinafter, also referred to as a "row (X direction)", respectively. The recording data is created in the image processing section 201 and then is temporarily stored in the band memory 204 by the band memory controlling section 203. After the recording data corresponding to one scan is stored in the band memory 204, the carriage is scanned in the main scanning direction. In so doing, an encoder pulse inputted by the encoder 208 is counted by the encoder counter 209 and, in accordance with this encoder pulse, a recording data is read out from the band memory 204. Then, on the basis of the image data, ink droplets are ejected from the printing head 207. In the case that a bidirectional recording system wherein an image is recorded upon outward scanning and homeward scanning (outward recording and homeward recording) of the printing head 207 is employed, the image data is read out from the band memory 204 depending on the scanning direction of the printing head 207. For example, an address of the image data read out from the band memory 204 is increased sequentially when the outward recording is performed, while an address read out from the band memory 204 is decreased sequentially when the homeward scanning is performed.

In a practical sense, a writing of an image data (C, M and Y) created by the image processing section 201 into the band memory 204 and a subsequent preparation of the image data corresponding to one band enable a scanning of the printing head 207. Then, the image data is read out from the band memory 204 subsequent to a scan of the printing head 207, so that the printing head 207 records the image on the basis of the image data. During the recording operation, an image data to be recorded next is created at the image processing section 201 and thus created image data is written into an area of the band memory 204 corresponding to a recording position.

As has been stated above, the band memory controlling is carried out in such manner that a writing operation in which a recording data (C, M, Y) created by the image processing section 201 is written into the band memory 204 and a reading operation for transferring the recording data (C, M, Y) to the head controlling section 206 in accordance with a scanning movement of the carriage are changed over.

A mask memory controlling in FIG. 14 is explained as below.

This mask memory controlling is required when a multipass recording system is employed. In using the multipass recording system, the recording image corresponding to one line which has a width corresponding to a length of the nozzle array of the printing head 207 is divided into a plurality of scannings of the printing head 207 to record. That is, conveying amount of the printing medium to be intermittently carried to the sub-scanning direction is made to be 1/N of a length of the nozzle array. For example, when N=2, a recording image corresponding to one line is divided into two scans to record (two-pass recording), and when N=4, a recording image corresponding to one line is divided into four scans to record (four-pass recording). In similar fashion, when N=8, it becomes eight-pass recording, and when N=16, it becomes sixteen-pass recording. Therefore, the recording image corresponding to one line will be completed by a plurality of scans of the printing head 207.

Practically, a mask data for assigning the image data to a plurality of scans of the printing head 207 is stored in the mask memory 205, and then based on a conjunction (AND) data between the mask data and the image data, the printing head 207 ejects inks to record the image.

Also, in FIG. 14, a voice data stored in the CF card 105, alike the image data, is transferred to the printer section B100 through an interface 210 by the ASIC 102. The voice data transferred to the printer section B100 is encoded at the voice encoder 230 and then recorded with the image to be printed as a two-dimensional code data. When there is no necessity to input a voice data into a printing image, or when printing an image without a voice data, of course, the encoded voice data is not printed but only the image is printed.

Figure 15:
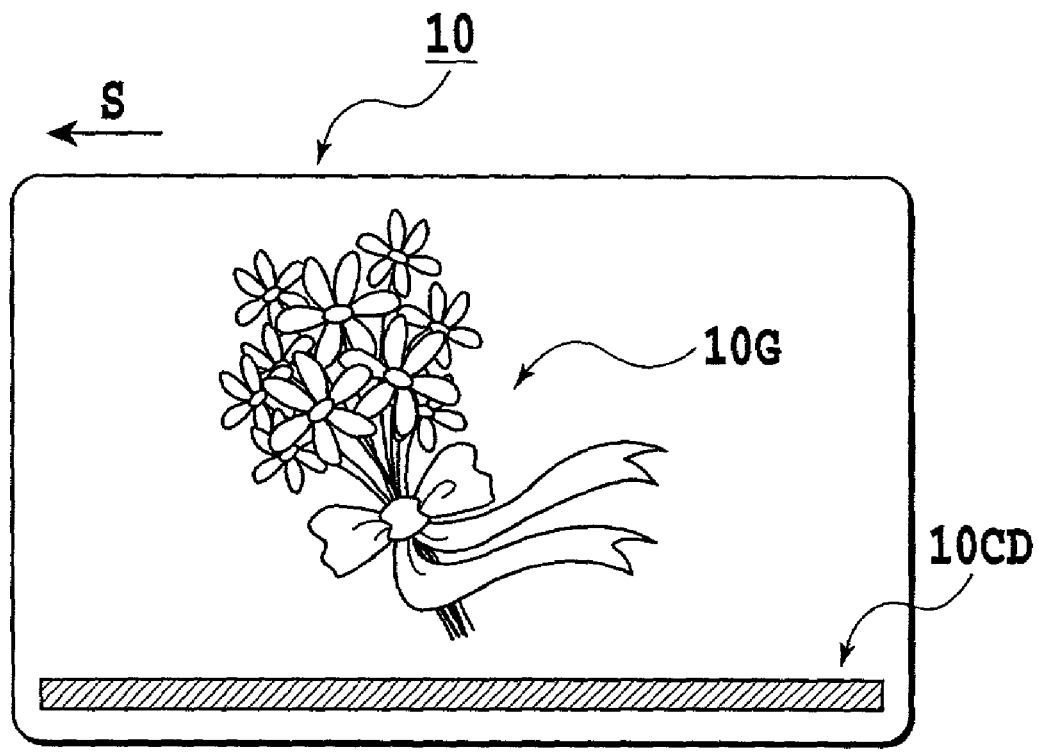
FIG. 15 is a diagram showing a printed example of sound information according to an embodiment of the present invention printed with an image.

FIG. 15 is a schematic diagram showing an example of printed matter in which sound data is printing outputted as part of the printed image. The figure shows an example of a position where sound data is printed in the printed matter as will be described later.

In the figure, a printed matter 10 is formed on a printing medium by printing a taken image 10G and a code data 10CD of a two-dimensional bar code which shows sound information inputted in relation to the taken image through voice inputting.

The printed matter 10 is such that, together with the taken image, conditions for image taking such as information on a subject of image taking (photographing) or a light condition at the time when taking the image 10G or comments on the subject of the image taking, which are inputted through a voice in any one of modes described in FIG. 19 or FIG. 20, is printed as code data. By this structure, the printed matter can be used as a storage medium which stores information of multi dimensions and is easy to access.

In the printed matter 10, its bar code 10CD part is read by a sound reproduction apparatus provided with a bar code reader which will be described later in FIG. 18, thereby reproducing the sound.

Processing of the above sound information inputting and printing output will be described more specifically below.

First, when the sound is inputted, sound data thereof is also stored in a file of taken image data with which the sound is related so that the sound data is managed along with the taken image data in the subsequent processing. Here, the correspondence between the sound data and the taken image data is made as follows. As will be described later in FIGS. 16 and 17, when the sound is inputted simultaneously with image taking, after pressing the release button for image taking, sound inputted for a predetermined number of seconds is caused to be recognized as data corresponding to just taken image data. Further, when sound is inputted through after recording, the image displayed on LCD during after recording can be recognized as image corresponding to the input sound.

The sound data stored in the CF card as above, in a form that is stored in the above file, is in a compressed condition similarly to an ordinary image data. The image data, when it is printing outputted, is extended, however, the sound data is outputted to the printer section in the form of compressed data of a capacity possible to be outputted as the two-dimensional bar code to the printing medium. Then, the printer section printing outputs the two-dimensional bar code as sound information on a basis of the compressed data.

In an embodiment of the present invention, an output position in the printed matter of the sound code data to be printed is controlled according to an image taking posture detected by a posture sensor provided in the camera section A100 as described before.

Figure 16A:
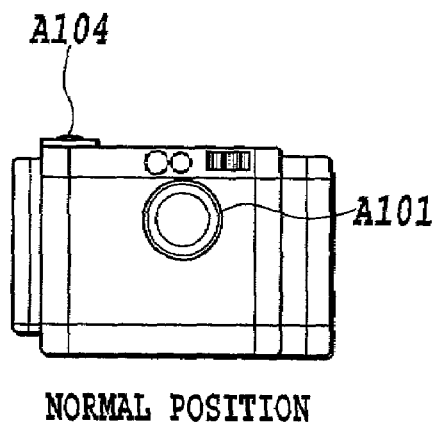
FIGS. 16A, 16B and 16C are diagrams showing image taking postures of a printer built-in camera according to an embodiment of the present invention.
Figure 16B:
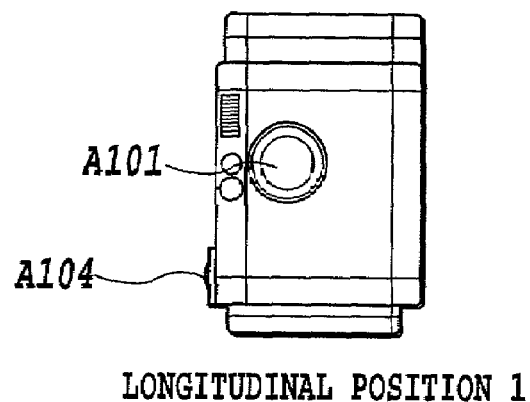
Figure 16C:
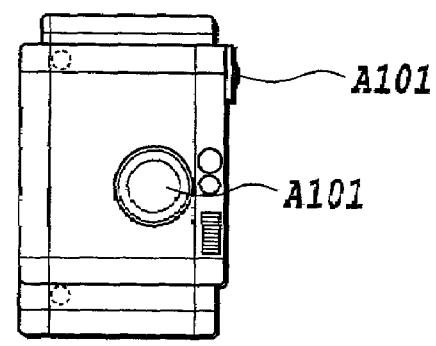

FIGS. 16A, 16B and 16C are diagrams showing image taking postures of the printer built-in camera of the present embodiment.

Image taking postures assumed by the present embodiment include a normal position shown in FIG. 16A, that is, a position where the user holds the camera in long sideways and the release button A104 is located at an upper position, a longitudinal position "1" shown in FIG. 16B, that is, a position where the camera is held vertically and the release button is located at right below as viewed from the user, and a longitudinal position "2" shown in FIG. 16C, that is, a position where the camera is held vertically and the release button is located at left above as viewed from the user.

FIGS. 17A, 17B and 17C are diagrams showing printed matters taken in these postures, which when the user takes in a normal posture, correspond to images as viewed through a finder A102 of the image taking postures as shown in FIGS. 16A, 16B and 16C, respectively.

As shown in these figures, code patterns of the sound information are, in any image taking posture, printed under a standing image of the printed image and along an edge of the printed matter. This position, when the image 10G in the printed matter 10 is viewed as the above standing image, that is, when viewed as the same image as viewed through the finder, is that the pattern is positioned at the underside and along the edge of the printed matter. Thus, even when the code pattern is printed in part of the printed image, the entire part thereof does not provide visual instability, and its area can be reduced. As a result, it can be prevented that the sound code pattern is an offence to the eye of the viewer of the printed image.

Here, the image of the posture as viewed by the user through the finder is defined as the "standing image". For example, in the case that the posture sensor is constructed to be capable of distinguishing the normal position as shown in FIG. 16A from an upside down position thereof, the printed image when the image is taken in the latter posture of the camera (for example, when the user takes the image in the upside down posture) is the upside down image of the image 10G shown in FIG. 17A. This becomes the "standing image" as defined above, and the sound code pattern is printed in the same position of that as shown in FIG. 17A.

The present embodiment, further as shown in FIGS. 17A, 17B and 17C, is constructed to be suited for cases in which the sound code pattern data is different in the extension length depending on the output position. More specifically, as shown in FIG. 17A, the case that the pattern extends along the longer edge of the printed matter 10 can make the pattern longer than the case that the pattern extends along the shorter edge as shown in FIGS. 17B and 17C. Therefore, in the present embodiment, at the time of image taking postures of longitudinal position "1" and longitudinal position "2" as shown in FIGS. 17B and 17C, a width b of the printed sound code pattern is made greater than a width a in the case of normal position shown in FIG. 17A. With this configuration, an amount of printable sound data can be made the same regardless of the image taking posture. Further, when, independent of the image taking posture, the amount of inputted sound data is large, the above width may be increased as far as the quality of the printed image is not deteriorated.

The above-described printing output position control is, as described above with reference to FIG. 12, performed on a basis of processing execution of a predetermined program by CPU 120 of the camera section A100. Specifically, according to the camera posture detected by the posture sensor, data showing the print position of the sound code data is stored in the image file, which stores the subject image data of the sound inputting, together with the sound data. Then, the CPU 220 of the printer section B100, when printing the image, performs processing of overwriting the code pattern data on the print image data so as to print the code pattern at the position on the basis of the print position data of the file.

Figure 18:
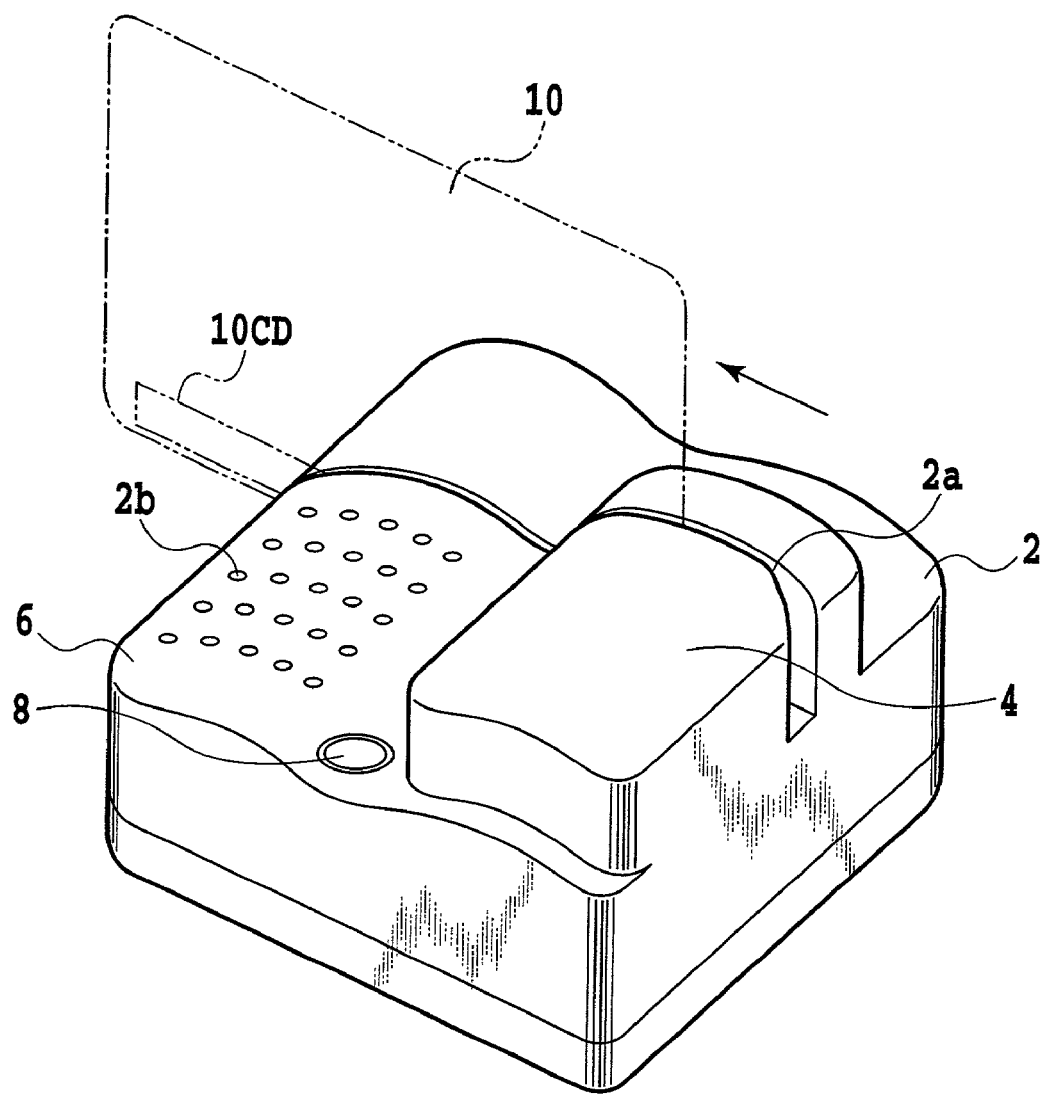
FIG. 18 is a perspective view showing a sound reproduction apparatus according an embodiment of the present invention.

FIG. 18 is a perspective view showing an example of a reproduction apparatus for reading the sound code printed on the printed matter and reproducing the sound.

The reproduction apparatus comprises a read/transportation unit and a control block provided on an inner side of a body 2 forming an outer case. The read/transportation unit is provided with a transportation section for transporting the printed matter 10, and a reader for reading the code pattern 10CD of the printed matter 10. The control block is provided with a controller for controlling these transportation and reading and a speaker for outputting the reproduced sound and its driver.

In the above construction, when the printed matter 10 is inserted in a slit 2a formed in the body 2 in a posture so that a part of the code pattern 10CD can be read, reading of the code pattern is performed while transporting the printed matter, and the sound is reproduced. In this case, it is needless to say that the posture of inserting the printed matter 10 is different according to the print position of the above-described code pattern. Then, the reproduced sound is outputted by the speaker. A plurality of through-holes in the body 2 are those for the speaker, and a reference numeral 8 designates an input operation section of the reproduction apparatus.

With the above-described embodiment, it is possible that the sound data related to the taken image is inputted together with the taken image and printing outputted with the image. In addition with this, the print position of the sound data can be automatically determined to an appropriate position. By this operation, a problem that the print pattern becomes the offense to the eye of the viewer can be prevented.

In the above embodiment, the camera posture is automatically detected by the posture sensor and accordingly the print position is controlled, however, application of the present invention is not limited to this example. For example, it may be possible that by operating an operation key by the user, image taking position data at that time is inputted, and accordingly the print position is controlled.

Further, in the embodiment of the present invention, sound inputting is performed in two modes of a mode of simultaneous with image taking (hereinafter referred to as "automatic input mode") and a mode of discretionary timing after image taking (hereinafter referred to as "after-recording mode").

FIG. 19 is a flow chart showing processing performed for sound inputting during image taking (automatic input mode) according to the present embodiment.

This processing is started to operate when the release button is pressed down for image taking, first, in step S161, a judgement is made as to whether or not the automatic input mode is set for sound inputting. This mode can be set by the user by using the operation switch. When it is judged that the automatic input mode is set, as sound inputting during image taking, in step S162, sound data inputted through the microphone 102 after the release button is pressed is stored in a CF card. This is continued in the camera of the present embodiment for 5 seconds (step S163) and then the present processing is completed. That is, in the present embodiment, sound input can be performed for 5 seconds after pressing the release button. When the automatic input mode is not judged in step S161, it is for the present judged as to be the after-recording mode, and the present processing is completed. That is, sound input is not performed during image taking.

On the other hand, sound inputting performed at a discretionary timing after image taking and printing of the code data are performed as a processing for printing a taken image.

FIG. 20 is a flow chart showing the processing. This processing is started when the user presses down the image reproduction button in the printer built-in camera. When this processing is started, first, in step S171, one of taken images is displayed on LCD 106. The user, while looking at the displayed image, makes a selection as to whether or not this image is printed (step S172). Here, if the user does not select it and takes an operation for shifting to a next picture of the display, the next taken image is displayed.

When the displayed image is selected, in steps S173 and S174, a judgment is made as to whether or not any one of a printing key and a sound input key is pressed. That is, when the user selects only printing and presses down the printing key, the processing goes to step S177, where the data is transferred to the printer section B100 so that only the taken image selected in step S172 is printed, and the image data is deleted from the CF card.

On the other hand, in the case that sound is inputted for the image selected in step S172 and its code data is printed together with the image, that is, in the after-recording mode, first the user presses down the sound input key. According to this operation, it is judged that the sound input key is pressed down in step S174, and in steps S175 and S176, for 5 seconds after pressing the key, sound data inputted through the microphone 102 is stored in the CF card 105. After that, pressing down of the print key is awaited (steps S173 and S174). When the print key is pressed down, similarly to the above-described processing of only printing, processing shown in steps S177 and S178 is performed. However, the data transferred to the printer section is the image overlapped with the sound code data. By this operation, in the printer section B100, the printed matter printed with the sound code data in part of the image as shown in FIG. 15 can be outputted.

As described above, with the present embodiment, sound inputting and its code pattern data can be printed at a discretionary timing associated with printing of a taken image, flexibility of sound information to the printed image is increased, and information on printed matter obtained can be even further ungraded or multi-dimensionalized.

In the above embodiment, sound information is inputted by a microphone provided in the printer built-in camera, however, a structure for taking sound information is not limited to this. For example, sound information may be previously stored in a predetermined memory and transferred to the camera memory to be printed.

Further, in the above-described embodiment, the camera section A100 forming one body together with the printer section B100 has been described as a printer built-in camera.

However, it is possible that the camera section A100 and the printer section B100 are separated to be separate apparatuses, and these are similarly constructed in the construction connected through the interface 210 of a wireless or a wired one and the like to achieve the same function. For example, also in an information processing system in which a scanner is used as a device having image taking function, and a printer is used as a device having image formation function, the present invention can be applied. In this specification, the information processing apparatus is referred including the above information processing system.

As can be seen from the above description, with the above-described embodiments, since sound information taken by sound taking means is printed as a code data in a part of a printed image when the taken image is printed on a printing medium by an image forming function, a print result can together hold not only the taken image but also information related thereto.

As a result, through the sound information, for example, image taking environment such as information related to a subject of image taking at the time of image taking or light condition, or a comment on the image taking subject can be inputted, and thereby the printed matter can be used as a storage medium which stores higher dimensioned information and is easy to access.

Further, when a taken image is printed on a printing medium, and sound information is printed as code data in part of the printed image, the printing position of the code data can be switched.

In particular, since switching is performed according to image taking posture of a camera or the like, even when the printing output position of the printed image relative to the printing medium is changed, the code data can always be outputted to a constant position to the printed image, for example, at a position where the code data is not an offence to the eye of the viewer of the printed image.

As a result thereof, when sound code data is together printed, deterioration of image quality of the printed matter can be prevented.

Further, since taking of sound information is performed at a discretionary timing after image taking by an image taking function, and code data of the sound information is printed in part of the taken image on a basis of the taken sound information, at any time other than image taking, information related to the printed image can be inputted through sounds and printed.

The above and other objects, effects, features and advantages of the present invention will become more apparent from the following description of embodiments thereof taken in conjunction with the accompanying drawings.

As a result, flexibility of sound information to the printed image is increased, and information of obtained printed matter can be even further upgraded or multi-dimensionalized.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. An information processing apparatus having an image taking function and an image forming function for performing printing on a printing medium, said apparatus comprising:

sound taking means for taking sound information; and printing output control means for, when the image forming function prints an image taken by the image taking function on the printing medium, causing the image forming function to print the sound information as code data in a part of the image, a printing position of the code data on the printing medium being changeable.

wherein said printing output control means controls the image forming function to print the taken image on substantially a whole area of the printing medium, which has a rectangular shape, and controls the code data to be printed under a standing image of the taken image and along an edge of the printing medium, and wherein when the edge is a relatively shorter edge of the rectangular shape, said printing output control means controls the image forming function to print the code data so that a width of the code data is made larger than that when printing the code data on a relatively longer edge of the rectangular shape.

2. An information processing apparatus having an image taking function and an image forming function for performing printing on a printing medium, said apparatus comprising:

sound taking means for taking sound information;

printing output control means for, when the image forming function prints an image taken by the image taking function on the printing medium, causing the image forming function to print the sound information as code data in a part of the image; and control means for causing said sound taking means to take the sound information at discretionary timing after taking an image by means of the image taking function, and based on the taken sound information, cause said output control means to control the code data to be printed in the part of the image taken.

3. An information processing apparatus as claimed in claim 2, further comprising means for executing an after-recording mode in which said control means causes said sound taking means to take the sound information at discretionary timing and causes said printing output control means to control the image forming function to print the code data and for executing an automatic inputting mode in which said control means causes said sound taking means to take the sound information simultaneously with taking an image.

4. An information processing apparatus as claimed in claim 2, wherein said control means deletes the image taken and the sound information from a memory storing the image taken and the sound information taken when the image forming function prints the image taken.

5. An information processing apparatus as claimed in claim 2, wherein the image forming function performs printing by means of ink jet method.

6. An information processing apparatus as claimed in claim 2, wherein the code data is in the form of two dimensional bar code data.

7. An information processing apparatus as claimed in claim 2, wherein said information processing apparatus is constructed with a camera section having the image taking function and a printer section having the image forming function as one body.

8. An information processing apparatus as claimed in claim 2, wherein said information processing apparatus is constructed with a camera section having the image taking function and a printer section having the image forming function as separate bodies and the camera section and the printer section are connected with each other through an interface.

9. An information processing apparatus as claimed in claim 2, wherein said information processing apparatus is constructed with a scanner having the image taking function and a printer having the image forming function as one body.

10. An information processing apparatus as claimed in claim 2, wherein said information processing apparatus is constructed with a scanner having the image taking function and a printer having the image forming function as separate bodies and the camera section and the printer section are connected with each other through an interface.

11. An information processing apparatus as claimed in claim 7, wherein said printer section performs printing by means of ink jet method.

12. An information processing apparatus as claimed in claim 2, wherein the code data is printed on an end portion of the printing medium.

13. An information processing apparatus as claimed in claim 2, wherein the sound information taken is stored in a storage medium in the form of the compressed data.

* * * * *

UNITED STATES PATENT AND TRADEMARK OFFICE
CERTIFICATE OF CORRECTION

PATENT NO. : 7,024,109 B2
APPLICATION NO. : 09/948631
DATED : April 4, 2006
INVENTOR(S) : Hiroyuki Horii et al.

It is certified that error appears in the above-identified patent and that said Letters Patent is hereby corrected as shown below:

COLUMN 4
Line 14, "image." should read --image;--.
Line 23, "according" should read --according to--.
Line 48, "like" should read --as--.

COLUMN 5
Line 3, "Meantime" should read --Meanwhile--.
Line 12, "explained" should read --explained in--.
Line 63, "below ," should read --below,--.

COLUMN 9
Line 22, "B100:" should read --B100.--.

COLUMN 10
Line 67, "motors" (second occurrence) should read --"motors--.

COLUMN 18
Line 7, "changeable." should read --changeable,--.

Signed and Sealed this

Thirteenth Day of March, 2007

JON W. DUDAS
*Director of the United States Patent and Trademark Office*